US012775645B2

(12) United States Patent
Yurick et al.

(10) Patent No.: US 12,775,645 B2
(45) Date of Patent: Oct. 27, 2026

(54) RETRIEVAL AUGMENTED GENERATION SYSTEMS AND METHODS

(71) Applicants: Smith & Nephew, Inc., Memphis, TN (US); Smith & Nephew Orthopaedics AG, Zug (CH)

(72) Inventors: Steven Yurick, South Park, PA (US); Ashley A. Roakes, Memphis, TN (US); Nathan A. Netravali, Littleton, MA (US)

(73) Assignees: Smith & Nephew, Inc., Memphis, TN (US); Smith & Nephew Orthopaedics AG, Zug (CH)

( * ) Notice: Subject to any disclaimer, the term of this patent is extended or adjusted under 35 U.S.C. 154(b) by 0 days.

(21) Appl. No.: 19/251,342

(22) Filed: Jun. 26, 2025

(65) Prior Publication Data

US 2026/0003897 A1 Jan. 1, 2026

Related U.S. Application Data

(60) Provisional application No. 63/664,522, filed on Jun. 26, 2024.

(51) Int. Cl.
*G06F 16/00* (2019.01)
*G06F 16/3329* (2025.01)
*G06F 16/334* (2025.01)

(52) U.S. Cl.
CPC ........ *G06F 16/3329* (2019.01); *G06F 16/334* (2019.01)

(58) Field of Classification Search
CPC ........................... G06F 16/334; G06F 16/3329
USPC .......................................................... 707/769
See application file for complete search history.

(56) References Cited

U.S. PATENT DOCUMENTS 11,531,707 B1 * 12/2022 Samdani ............... G06F 16/335 707/707
2020/0372019 A1 * 11/2020 Tokarev Sela ...... G06F 16/2425 707/707
2024/0232539 A1 * 7/2024 Venkateshwaran .... G06N 3/044 707/707
2024/0412720 A1 * 12/2024 Vasylyev .......... G06F 16/90332 707/707
2025/0131247 A1 * 4/2025 Mondlock ............. G06N 5/022 707/707
2025/0238433 A1 * 7/2025 Sussman ................ G06Q 10/10 707/707

(Continued)

*Primary Examiner* — Alexandria Y Bromell
(74) *Attorney, Agent, or Firm* — ArentFox Schiff LLP; Joseph M. Maraia

(57) ABSTRACT

The disclosed Retrieval Augmented Generation systems and methods include a system with several components. First, a user interface generates a query for a large language model (LLM). The system features prompt generator circuitry that accesses a database containing documents, each with priorities linked to various factors. This circuitry retrieves context and factor priorities from these documents in response to the query. The system also includes an LLM interface that submits a query to the LLM, incorporating the original query, retrieved context, and factor priorities. The system then receives a response from the LLM, which includes data related to the documents and factor priorities. Finally, an output interface presents the user with response data from the LLM, detailing information about the documents and the retrieved factor priorities.

16 Claims, 17 Drawing Sheets

(56) References Cited

U.S. PATENT DOCUMENTS

| | | | | | |
|---|---|---|---|---|---|
| 2025/0278415 | A1* | 9/2025 | Mui | G06F 16/9024 | 707/707 |
| 2025/0371016 | A1* | 12/2025 | Vetzler | G06F 16/24578 | 707/707 |

* cited by examiner

600

700D

RETRIEVAL AUGMENTED GENERATION SYSTEMS AND METHODS

CROSS-REFERENCE TO RELATED APPLICATIONS

This application claims the benefit of U.S. Provisional Application No. 63/664,522, filed Jun. 26, 2024, which is herein incorporated by reference.

TECHNICAL FIELD

The present application generally relates to Retrieval-Augmented Generation for supplementing generative Artificial Intelligence (AI) systems.

BACKGROUND

Large Language Models (LLMs) are generative AI systems that provide text-based responses to input queries. Examples of such LLMs are ChatGPT provided by OpenAI and Gemini provided by Google. The input queries can be text-based in the case of ChatGPT 3.5, or image and/or text-based in the case of ChatGPT4.

While the performance of such LLMs is exceptional, they have some known disadvantages, especially since they are "frozen", that is, the knowledge with which the LLMs have been trained will be up to date only up to a certain point in time. Other disadvantages include so-called hallucinations.

Retrieval-Augmented Generation (RAG) for LLMs attempts to surmount the above shortcoming of LLMs. However, even RAG itself has disadvantages, in particular, the quality of the information retrieved can be low precision misaligned retrieved chunks as well as suffering from the so-called "lost in the middle" problem and hallucinations.

Accordingly, there is a desire to improve information retrieval systems that use generative AI systems such as, for example, LLMs.

BRIEF DESCRIPTION OF THE DRAWINGS

By way of illustration, specific non-limiting examples of RAG systems, methods and machine-readable storage will now be described, with reference to the accompanying drawings, in which.

DETAILED DESCRIPTION

Figure 1:
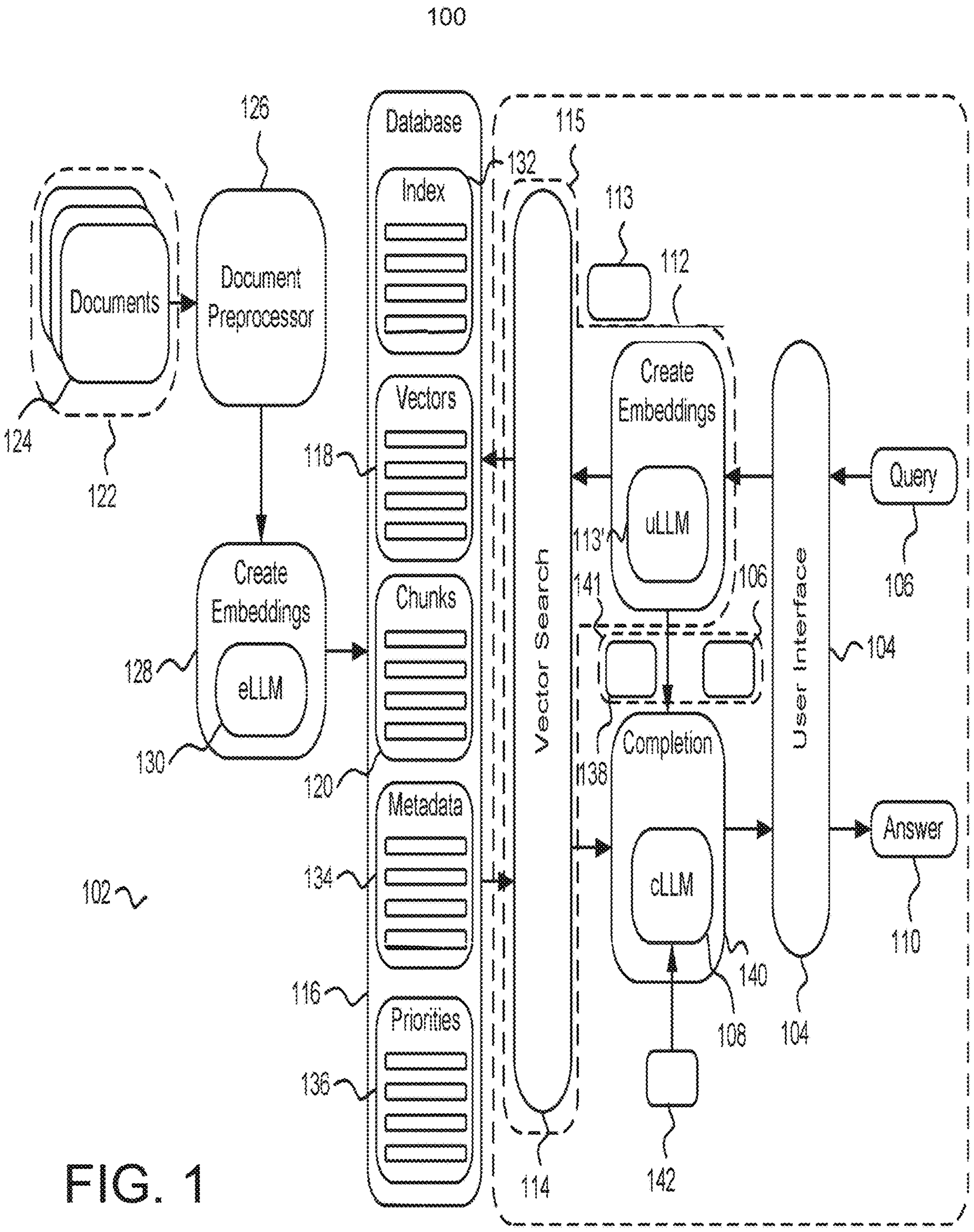
FIG. 1 depicts a view of a Retrieval Augmented Generation (RAG) system according to examples.

Referring to FIG. 1, there is shown a view 100 of a Retrieval Augmented Generation (RAG) system 102 according to an example. The RAG system 102 comprises a user interface 104. The user interface 104 is arranged to present a discussion user interface such as, for example, a chatbot interface, to a user (not shown). Therefore, the user interface 104 is arranged to receive a user query 106 to be submitted to a completion Large Language Model (cLLM) 108 and to output a cLLM response 110 to the user query from the cLLM 108. A completion LLM is an LLM that provides the response to the user query. A user query is an example of a user prompt.

The RAG system 102 comprises a query text embedder 112 to convert the user query 106 into a user query vector 113 suitable for use by a vector search module 114 to search a vectorized database 116 for semantically relevant matches. Although the example has been described with reference to converting the user query 106 into a vector form suitable for searching for relevant matches within a vectorized database 116, examples are not limited to such an arrangement. Examples can be realized in which the query text embedder 112 converts the user query 106 into an alternative form suitable for use in performing some other form of semantic search for relevant matches. Converting the user query 106 into a user query vector 113 uses an embedding model that is accessible via an embedding API. An example of such an embedding model can be realised in the form of a user query embedding Large Language Model (uLLM) 113', by submitting a request to the uLLM 113' to produce the user query vector 113 corresponding to the user query 106. The process of determining the user query vector 133 from the user query 106 is known as creating an embedding.

Embeddings can be realised using, for example, an embedding API end point together with an embedding model name.

The database 116 contains a set of vectors 118. Each vector is associated with a respective chunk of a set of chunks 120. Each chunk in the set of chunks 120 is derived from a respective document contained within a knowledge base 122. The knowledge base 122 comprises at least one document. In the example depicted, the knowledge base 122 comprises a number of documents 124. The documents 124 in the knowledge base 122 can take one or more than one form of a number of formats. For example, the documents 124 can comprise one or more than one of the following, taken jointly and severally in any and all permutations: text documents such as Word documents, presentation documents such as Power Point documents, spreadsheets such as Excel documents, PDFs, images, videos, audio files, and audio-visual files such that the term document is synonymous with medium or media.

The documents 124 are preprocessed by a document preprocessor 126. The document preprocessor 126 is arranged to convert the documents into a form suitable for use by a document text embedder 128. Therefore, the document preprocessor 126 is arranged to segment a given document into one or more of the above-described chunks. A chunk is a portion of text extracted from, or corresponding to, a segment of a document. A document can have a set of corresponding chunks. The set of corresponding chunks comprises one or more than one chunk. In examples in which a set of corresponding chunks comprises a plurality of such chunks, the set of corresponding chunks can comprise at least one set of overlapping chunks. The at least one set of overlapping chunks can comprise at least two chunks that overlap with one another. Overlapping chunks share respective common portions. The common portions can comprise at least common text present in at least two chunks. The set of overlapping chunks can comprise multiple overlapping chunks. The multiple overlapping chunks can comprise at least one, or both, of: contiguous overlapping chunks or non-contiguous distinct sets of overlapping chunks. The chunks can align with logical sections of a respective document such as, for example, pages or paragraphs.

The document text embedder 128 processes each chunk to produce a respective vector that is added to the vector database 116 as one of the set of vectors 118. The vectors are also known as embeddings or embedding vectors. The document text embedder 128 produces a semantically meaningful vector representation of a respective chunk. The document text embedder 128 can use, for example, embedding model that accessible via an embedding API. Examples of such a document text embedder 128 can be realised using an embedding Large Language Model (eLLM) 130 to produce a vector corresponding to a given chunk. The eLLM 130 can be local or network accessible. The eLLM 130 take a given chunk as an input and produce a corresponding vector as an output. The eLLM 130 and the uLLM 113' can be same LLM, or identical instances of the same LLM.

An index 132 can be created to facilitate searching the set of vectors 118 for one or more than one semantically similar matching vector with the user query vector 113 produced by the query text embedder 112. Each vector in the set of vectors 118 is associated with a respective chunk in the set of chunks 120. The chunks can be stored as part of the database 116 or be accessible from the database 116 rather than being stored as part of the database 116.

The database 116 can also comprise a set of metadata 134. The set of metadata 134 comprises data relating the chunks, or vectors, corresponding to respective documents 124 in the knowledge base 122. The metadata 134 can comprise data describing, or associated with, each respective document in the knowledge base 122. Examples can be realised in which the metadata 134 comprises citations associated with respective documents contained within the knowledge base 122. The metadata 134 can also comprise additional data. For instance, examples can be realised in which the metadata 134 associated with a respective document can be derived or otherwise determined using LangChain, in particular, using the Doctran library available from, for example, https://python.langchain.com/docs/integrations/document_transformers/doctran_extract_properties/. The meta data to be extracted can be prescribed using a respective structure such as, for example, the "properties=[{ . . . }, { . . . }, . . . , { . . . }]" together with the DoctranPropertyExtractor() function.

The database 116 can also comprise, or at least have access to, a set of priorities 136. The set of priorities comprises one or more than one priority. Each priority in the set of priorities 136 is associated with at least a document 124 in the knowledge base 122 having one or more corresponding vectors or chunks stored in, or accessible to, the database 116. A priority associated with a respective document 124 is indicative of the relative importance of the document relative to at least a set of documents in the knowledge base 122. The set of documents in the knowledge base 122 can comprise all documents in the knowledge base 122 or one or more than one subset of the documents in the knowledge base 122.

The priority can relate to a set of factors. The set of factors can comprise one factor or multiple factors; each factor in the set can have a respective priority. For instance, the set of factors can comprise one or more than one of the following, taken jointly and severally in any and all permutations: Recency, Authoritativeness, Popularity, Geography, Trustworthiness, Modality, Credibility, and Promotion preference. Recency is associated with the date of publication of a respective document. Recency relates to how recent or current a document is in time. Authoritativeness is associated with a document's authority as indicated by, for example, one or more than one of the following taken jointly and severally in any and all permutations: Impact Factor, CiteScore, SCImago, Journal Rank and Source Normalized Impact per Paper. Popularity is associated with a measure of a document's popularity. A popularity measure can be determined or derived in any manner such as, for instance, a poll associated with the documents within the knowledge base 122, or a record of the number of downloads or accesses associated with a respective document. Geography is associated with a geography or geographical region of interest such as, for example, a country. For instance, the Geography could be Italy with a possible consequence that documents associated with such a prescribed Geography could return documents that are written in the Italian language. Trustworthiness is a measure of the trustworthiness of a respective document. The trustworthiness measure can be associated with, for example, a score associated with at least the following taken jointly and severally in any and all permutations: a methodology associated with the document, any conflicts of interest associated with the document, the accuracy of the information within the document and the writing quality of the document. Modality is associated with, or indicative of, the format of the document within the knowledge base 122

The priorities can be either user controlled priorities or automatically determined priorities resulting from processing the documents in the knowledge base 122.

The vector search module 114 returns vector search results 138 in response to the user query vector 113 that are semantically relevant. The vector search results 138 comprises a subset of one or more than one chunk of the set of chunks 120. For instance, the vector search results 138 can comprise one or more than one chunk comprising text. The vector search results 138 are fed to a completion interface 140. The completion interface 140 provides at least: the user query 106, or data derived therefrom, and the vector search results 138 to the completion LLM 108. The cLLM 108 processes the user query 106 and the vector search results 138 to produce the cLLM response 110. The cLLM 108 can be a local instance of an LLM or a network accessible LLM.

The vector search module 114 is an example of data retrieval circuitry 115. Furthermore, the combination of the query text embedder 112 and the vector search module 114 is an alternative example of such data retrieval circuitry 115.

Figure 2:
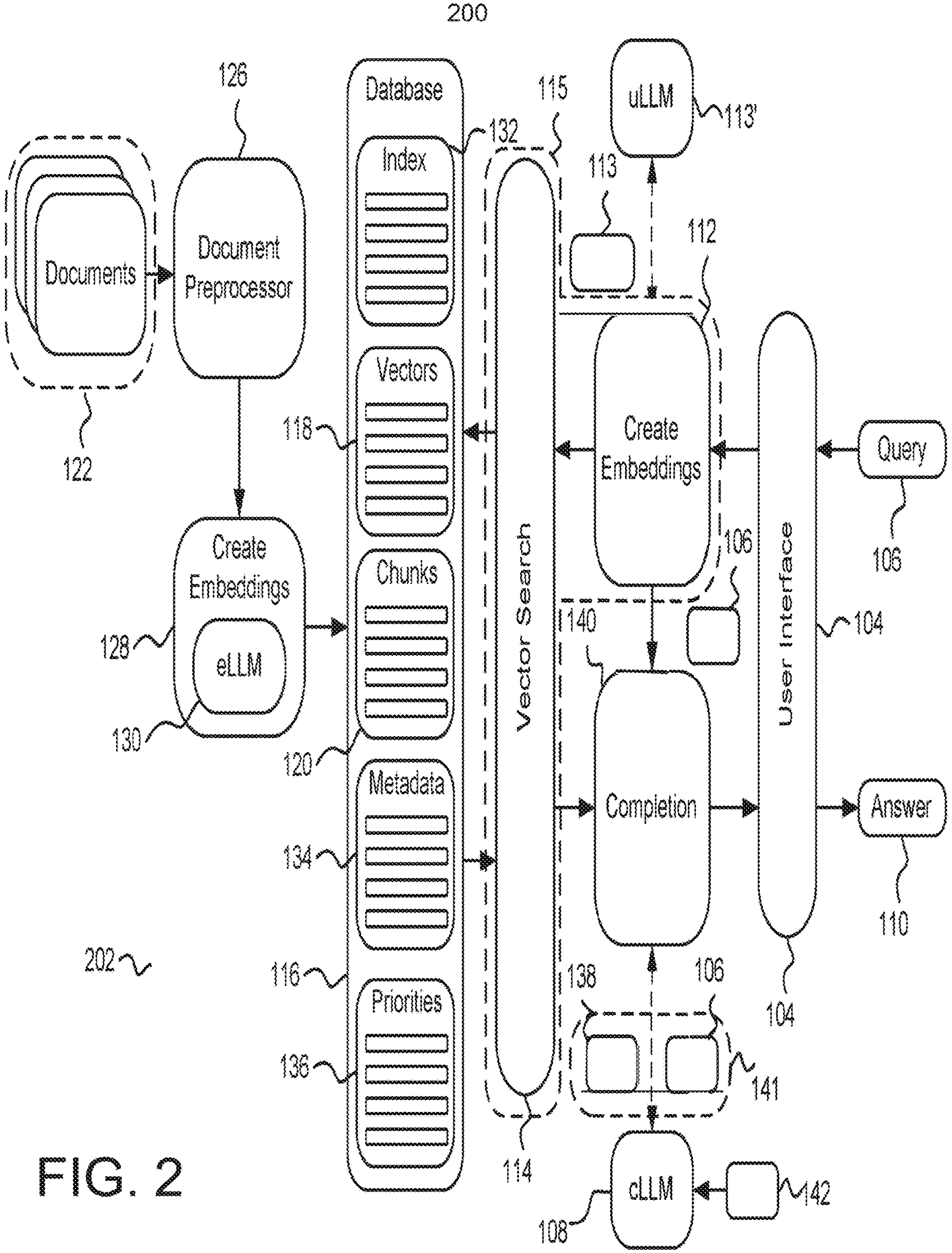
FIG. 2 shows a view of a further Retrieval Augmented Generation (RAG) system according to examples.

The cLLM 108 can be configured, via a respective system prompt 142, to process at least one, or both, of: the user query 106 and the vector search results 138 in a manner that is responsive to, or otherwise influenced or constrained by, the system prompt 142. The combination of the user query 106 and the vector search results 138 forms a prompt 141 that is submitted to the cLLM 108, which is depicted in FIG. 2. The prompt 141 submitted to the cLLM 108 can be a user prompt for that cLLM 108.

The system prompt 142 is arranged to ensure that the cLLM 108 takes into account the vector search results 138 when formulating the cLLM response 110. In particular, examples can be realised in which the system prompt 142 ensures that the priorities 136 associated with any chunks contained withing the vector search results 138 are taken into account when formulating the cLLM response 110. Taking into account the returned priorities comprises instructing the cLLM 108 to give respective or relative weight or respective or relative preference to the chunks having those respective priorities.

The system prompt 142 can take the form of a data structure comprising instructions for the cLLM. The instructions for the cLLM are arranged to indicate that the cLLM should take into account at least both of the following: the set of chunks returned as part of the vector search results 138 and a respective subset of priorities associated with the returned set of chunks. The set of chunks can comprise one or more than one chunk identified as a result of the vector search. The set of priorities can comprise at least one priority associated with the one or more chunks in the set of chunks. The priority associated with the chunks in the set of chunks can comprise a single priority common to all chunks, which could be the case in a situation in which multiple chunks originate from the same document that has a respective priority. Alternatively, at least one or more than one pair of chunks can have a common respective priority. For instance, if two chunks in the set of chunks are returned by the vector search that relate to the same document, those two chunks will have the same, that is, a common respective priority whereas one or more further chunks in the set of chunks that are returned by the vector search that relate to a different document will have the priority associated with that different document.

An example system prompt can have a format such as the following system_template=""""You are a wound care expert.

Use both your own knowledge and the following pieces of context to answer the user's query. ALWAYS return a "SOURCES" part in your response that includes at least one source from the provided context.

If the user's question implies that priority should be given to a factor of interest, take into account the factor of interest in formulating the answer.

List SOURCES at the end of your answer together with a respective priority relating to the factor of interest associated with the SOURCES.

Follow this example for how to format your response:

[answer here]

SOURCES:source1_document:priority; source2_document:priority

Begin!

{summaries}""""

Additionally, or alternatively, the user query 106 can comprise instructions indicating one or more priorities relating to the factors of the metadata 134 to be taken into account when formulating the cLLM response 110. In such an example, the system prompt 142 can be configured to condition the cLLM 108 to be responsive to any such priority or priorities indicated in the user query 106.

Referring to FIG. 2, there is shown a view 200 of a further Retrieval Augmented Generation (RAG) system 202 according to an example. Reference numerals common to FIGS. 1 and 2 refer to the same entity.

It can be appreciated that the uLLM 113' and the cLLM 108 are clearly indicated as being network accessible.

Although the examples described above with reference to FIGS. 1 and 2 feed the vector search results 138 to the cLLM 108, examples are not limited to such arrangements. For instance, the vector search results 138 can be processed before being fed to the cLLM 108. It will be appreciated in the above described FIGS. 1 and 2 that the vector search results 138 will comprise a set of measures of match or similarity, known as relevance scores, between the user query vector 113 and the vector search results 138. The set will comprise one or more than one such relevance score for each vector in the vector search results. Therefore, rather than using the associated retrieved set of priorities associated with the vector search results 138 as the basis on which the cLLM 108 formulates the cLLM response 110, some other measure or measures can be used as the basis for prioritising, or otherwise ranking, the retrieved chunks when processed by the cLLM 108. For example, such a measure or measures can be derived from a combination of the one or more than one relevance score and one or more than one respective priority. For instance, for a given retrieved chunk, the priority associated with that chunk can be multiplied or otherwise scaled by the corresponding relevance score of that retrieved chunk to provide the cLLM 108 with an indication of the relative importance or standing of that retrieved chunk as compared to any other retrieved chunk or chunks. Furthermore, examples can be realised in which the priority scaled by the relevance score can be used to filter the retrieved chunks provided to the cLLM 108. For instance, such filtering can comprise presenting a subset of the retrieved chunks to the cLLM 108 to use as the basis for forming the cLLM response 110. Alternatively, or additionally, the filtering can comprise reordering the vector search results 138 based on a combination of the relevance score and the priority prior to presenting the reordered results, or a subset of the reordered results, to the cLLM 108 for processing in formulating the cLLM response 110.

Figure 3A:
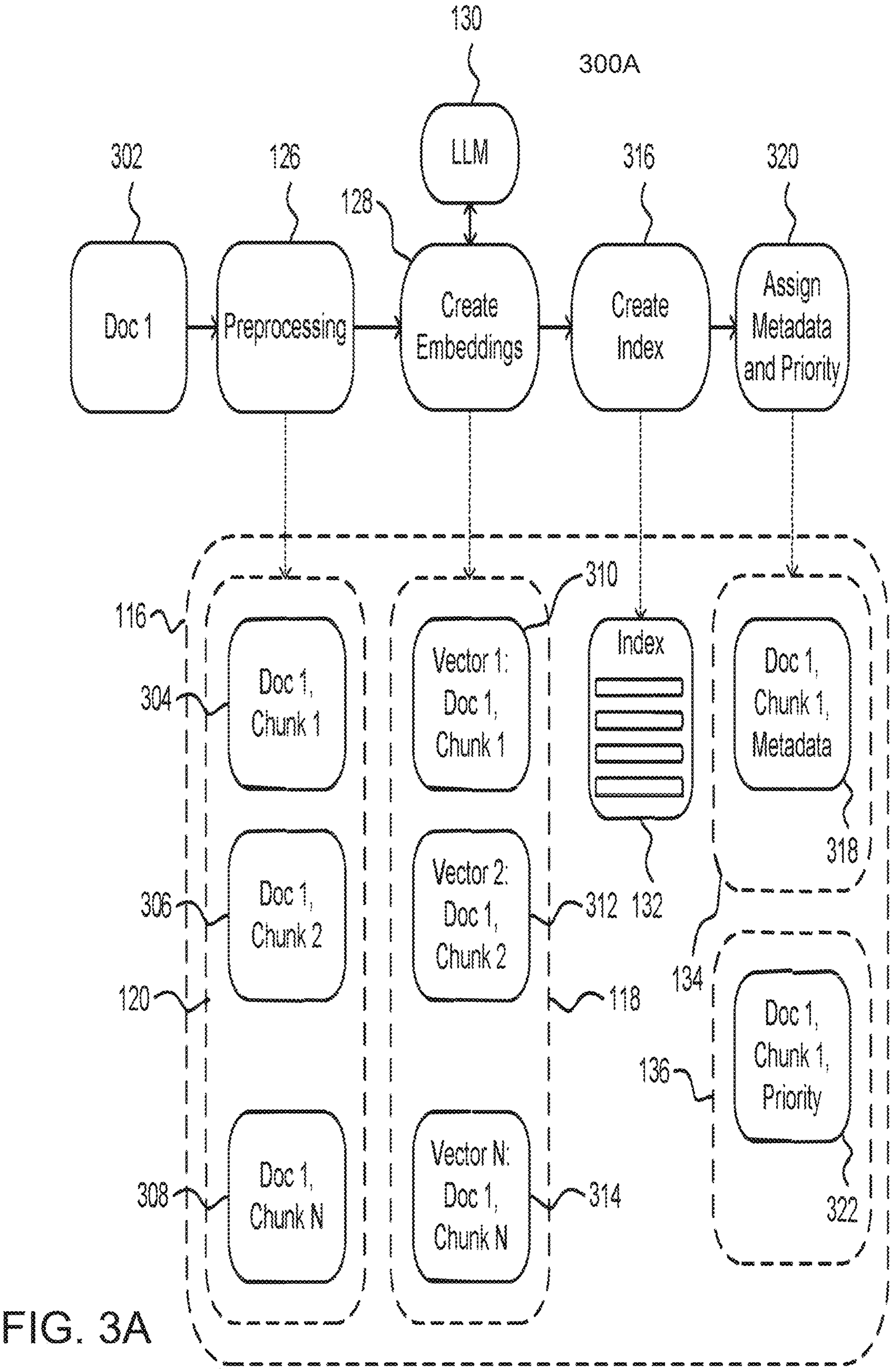
FIG. 3A illustrates a view of a database according to examples.

FIG. 3A illustrates a more detailed view 300A of the vector database 116 described above. The vector database 116 comprises the set of vectors 118 and corresponding set of chunks 120, the index 132, the set of metadata 134 and the set of priorities 136 for a single document 302. The document 302 is an example of one of the above-described documents 124.

In the example database 116 illustrated in FIG. 3, the set of chunks 120 comprises N chunks 304 to 308. The N chunks 304 to 308 correspond to sections of the document 302, which is labelled as "Doc 1". The set of chunks 120 is created by the document preprocessor 126. The set of vectors 118 comprises N vectors 310 to 314 corresponding to respective chunks of the set 120 of chunks 304 to 308. A first vector 310 corresponds to a first chunk 304, a second vector 312 corresponds to a second chunk 306 and an Nth vector 314 corresponds to an Nth chunk 308. The set of vectors 118 is created by the document text embedder 128. The document text embedder 128 contains, or has access to, the eLLM 130 for use in creating the vectors 310 to 314 corresponding to the chunks 304 to 308. The vectors 310 to 314 are also known as embeddings as indicated above.

An index creation entity 316 is arranged to create the index 132 from the vectors 310 to 314. The index creation entity 316 can be realised as either software instructions or as an interface, that is, a function call, to a function for creating an index from given vectors.

The set of metadata 134 is created by extracting meta data from the document 302. The meta data can include any of the meta data described above such as, for example, a citation. The set of metadata 134 is indicated in FIG. 3 as comprising meta data 318 relating to at least a chunk of the document 302. In the example depicted, the meta data 318 was created by a meta data generator (MDG) 320. The MDG 320 can be realised using LangChain as indicated above.

The MDG 320 can also be arranged to create the set of priorities 136 that are assigned to the documents 124. In the example shown, a priority 322 has been assigned to the first chunk 304 of the document 302. The priorities can be expressed at selectable levels of granularity. Examples can be realised in which a priority is assigned at the level of at least one or more than one of the following taken jointly and severally in any and all permutations: a document, a section of a document, a paragraph of a document, a chunk of a document, or the like.

Figure 3B:
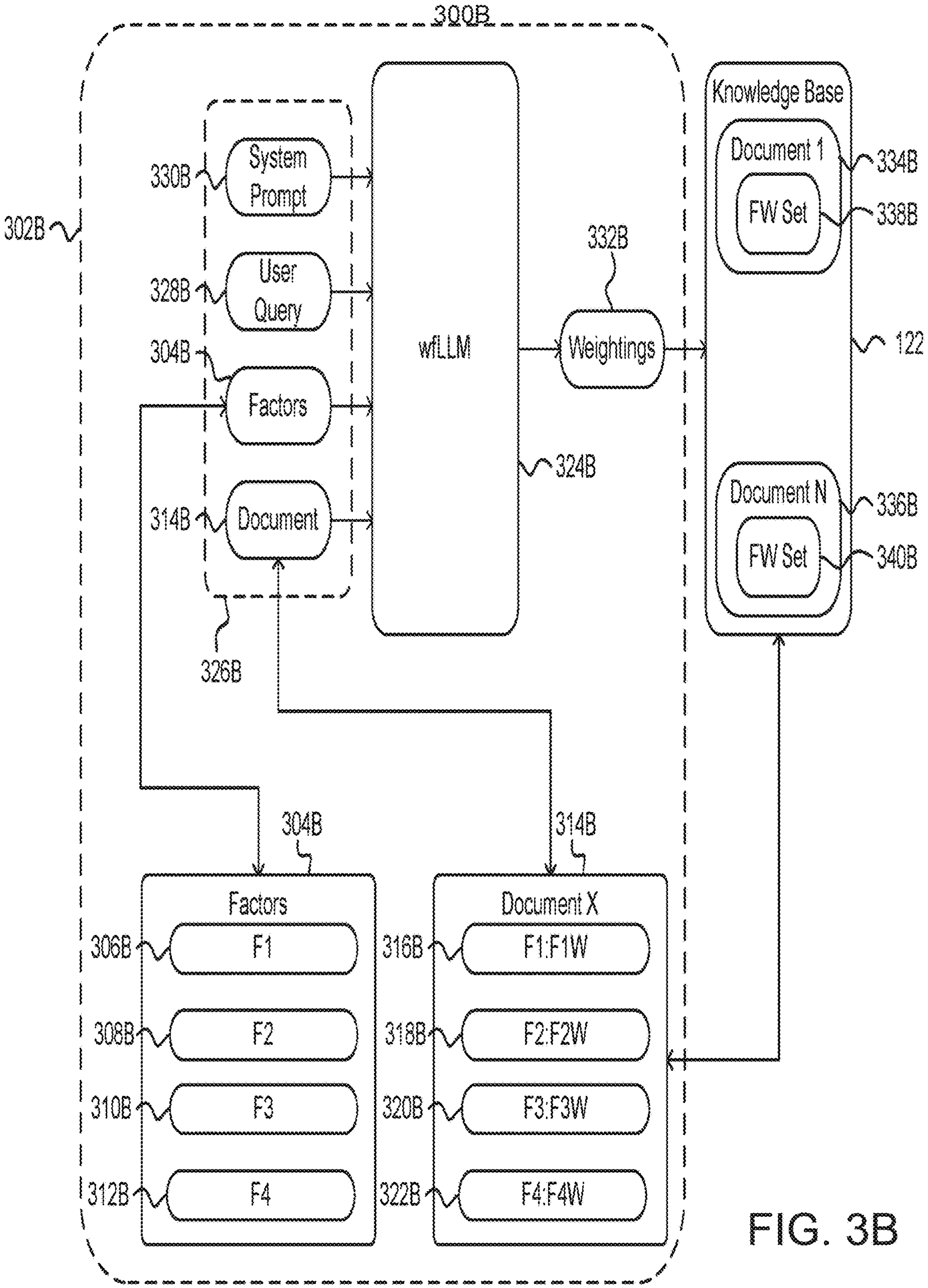
FIG. 3B shows a system for assigning priorities to factors of documents according to examples.

Referring to FIG. 3B, there is shown a view 300B of an example of weighting factor circuitry (WFC) 302B. The WFC 302B is arranged to provide each document of a set of documents with a respective set of weightings for factors associated with each document. The weightings reflect relative priorities or importance of respective factors such that the term "weightings" and "priorities" are synonymous, as are the singular versions of those terms. The weightings, that is, priorities, of the factors are used to form a set of priorities associated with a document, or a chunk of a document such as, for instance, the set of priorities 136 described above with reference to FIG. 3A. The set of documents can comprise one document or a plurality of documents. Examples can be realised in which the set of documents comprises the documents 124 of the knowledge base 122. The set of weighting factors can comprise a weighting factor or a plurality of weighting factors.

The set of weightings comprises one or more weightings each one being associated with each factor in a set of prescribed factors 304B. The set of prescribed factors 304B comprises a set of factors 306B to 312B that gives an indication, firstly, of the factors of a document that are of interest and, secondly, an indication of relative weightings or importance of those factors relative to one another. Examples can be realised in which the weights are prescribed by a user. However, examples can be realised in which the weightings are determined by an LLM. Still further examples can be realised in which the weightings are determined from a combination of such user prescribed weightings and weightings determined, or adjusted, by such an LLM. In the example depicted, the set of prescribed factors 304B comprises a four factors 306B to 312B.

A document 314B can be selected from, or provided by, the knowledge base 122 to have relative weightings 316B to 322B for each of the factors 306B to 312B determined using a weighting factor LLM (wfLLM) 324B. The weighting factor LLM (wfLLM) 324B is an LLM that is configured or instructed to return weighting factors using at least one or both of: a user prompt and a system prompt. In the example shown, a first factor, F1, has a respective weighting of F1W, a second factor, F2, has a respective weighting of F2W, a third factor, F3, has a respective weighting of F3W and a fourth factor, F4, has a respective weighting of F4W. The wfLLM 324B is responsive to a set of inputs 326B. The set of inputs 326B comprises a user query 328B, the set of factors 304B and a current document 314B to have respective the weightings for the factors determined. The set of inputs can also comprise a system prompt 330B. The user query 328B is arranged to instruct or request the wfLLM 324B to determine relative weightings for the prescribed factors 306B to 312B for the current document 314B. The system prompt 330B is arranged to condition to the wfLLM 324B to respond to the user query 328B to take into account the prescribed factors 306B to 312B specified in the set of prescribed factors 304B when determining a set of respective weightings 332B. The wfLLM 324B produces the set of respective weightings 332B corresponding to the current document 314B, that is, the set of respective weightings 332B from the priorities associated with the factors 306B to 312B of a current document 334B.

Although the present example can use a system prompt to condition or influence how any LLM described herein responds to a user query, examples are not limited thereto. Examples can be realised in which the user query contains sufficient information to perform the same function as performed by, or would have been performed by, the system prompt.

A respective set of weightings can be produced for each document in a set of documents contained within the knowledge base 122. The set of documents can comprise one or a plurality of documents contained within the knowledge base 122. In the example depicted, the knowledge base 122 is indicated as comprising N documents 334B to 336B with respective sets of weightings 338B to 340B corresponding to the prescribed factors 306B to 312B specified in the set of prescribed factors 304B.

It can be appreciated that the terms "priority", "priorities", "weighting" and "weightings" are examples of a figure of merit or of figures of merit, otherwise known as "merit measure" or "merit measures".

Figure 4:
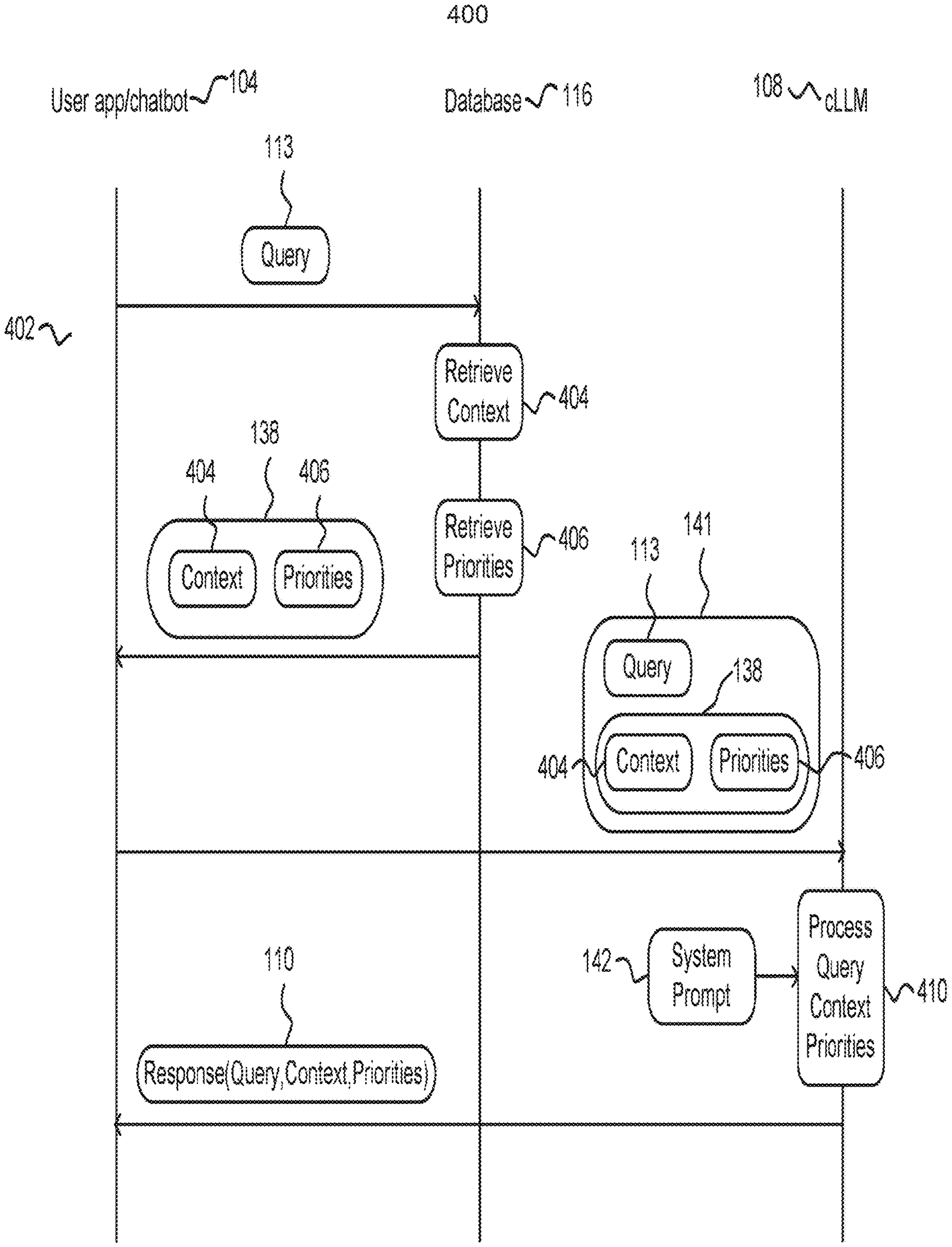
FIG. 4 depicts data flow associated with the system of FIG. 2.

Referring to FIG. 4, there is shown a view 400 of data flow 402 according to an example. The data flow 402 can relate to either of the above-described RAG systems 102 and 202.

The user query vector 113 is submitted, via the user interface 104, to the vector database 116 to find one or more than one match. The vector database 116 retrieves content or a context 404 associated with the match and also retrieves one or more than one respective priority 406 associated with the match. The content or context comprises one or more than one chunk of the above-described chunks. The vector search results 138 of the vector search comprises the content or context 404 and the respective one or more than one priority 406.

The user query 106 and the vector search results 138 of the vector search are submitted as a user prompt 141 to the cLLM 108. The cLLM 108 processes 410 the user prompt 141 and returns the cLLM response 110. The cLLM response 110 is a function of the initial user query 106, retrieved context from the vector search and the priority or priorities associated with the retrieved context. The cLLM response 110 is output via the user interface 104.

Figure 5:
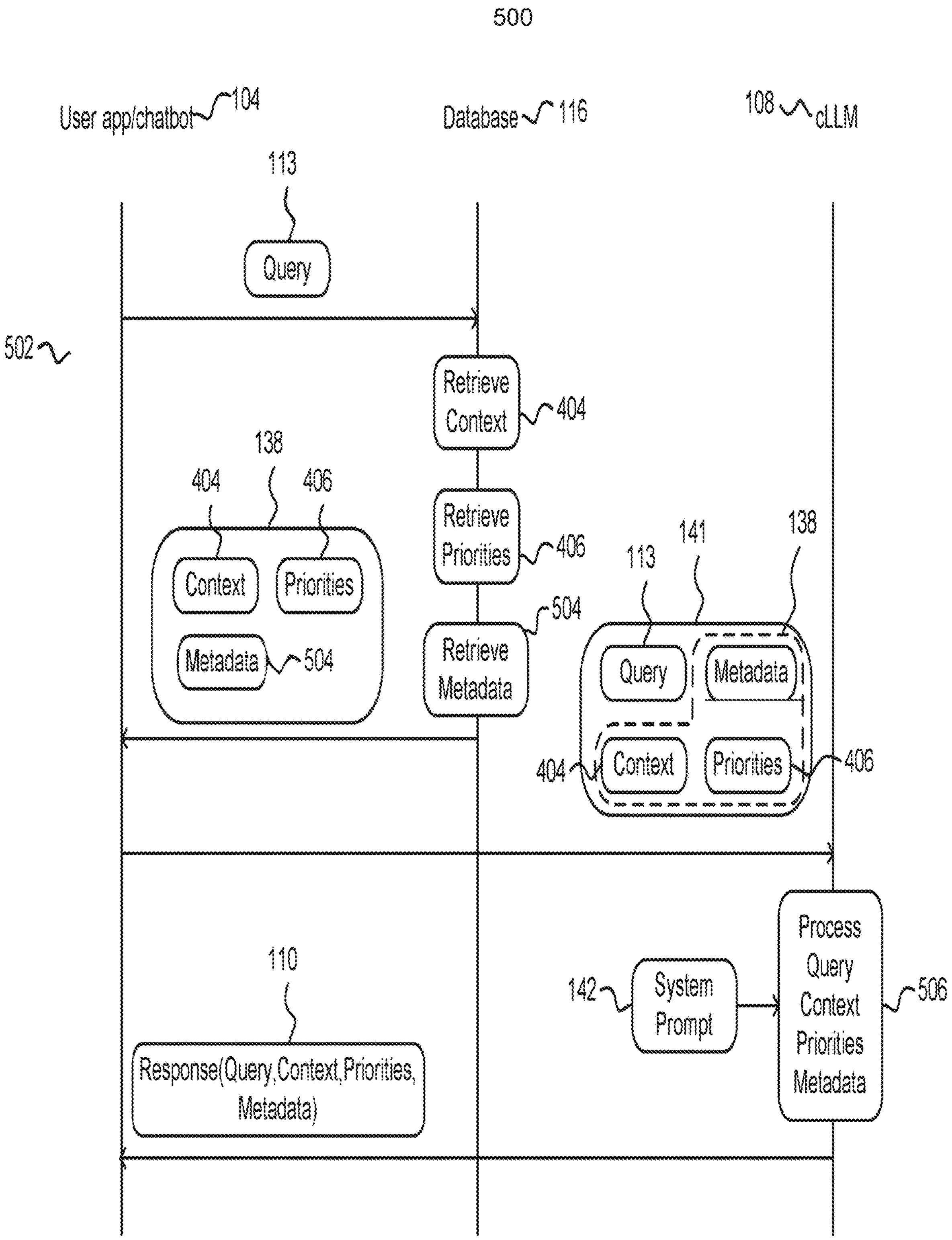
FIG. 5 illustrates data flow associated with the system of FIG. 3.

Referring to FIG. 5, there is shown a view 500 of data flow 502 according to an example. The data flow 502 can relate to either of the above-described RAG systems 102 and 202.

The user query vector 113 is submitted, via the user interface 104, to the vector database 116 to find one or more than one match. The vector database 116 retrieves content or a context 404 associated with the match, retrieves one or more than one respective priority 406 associated with the match, and retrieves meta data 504 associated with the retrieved context or chunks. The content or context comprises one or more than one chunk of the above-described chunks. The vector search results 138 of the vector search comprises the content or context 404, the respective one or more than one priority 406 and the associated meta data 504.

The user query 106 and the vector search results 138 of the vector search are submitted as a user prompt 141 to the cLLM 108. The cLLM 108 processes 506 the user prompt 141 and returns the cLLM response 110. The cLLM response 110 is a function of the initial user query 106, the retrieved content 404 from the vector search, the priority or priorities 406 associated with the retrieved content and the meta data 504 associated with the retrieved content 404. The cLLM response 110 is output via the user interface 104.

Figures 6A, 6B, 6C:
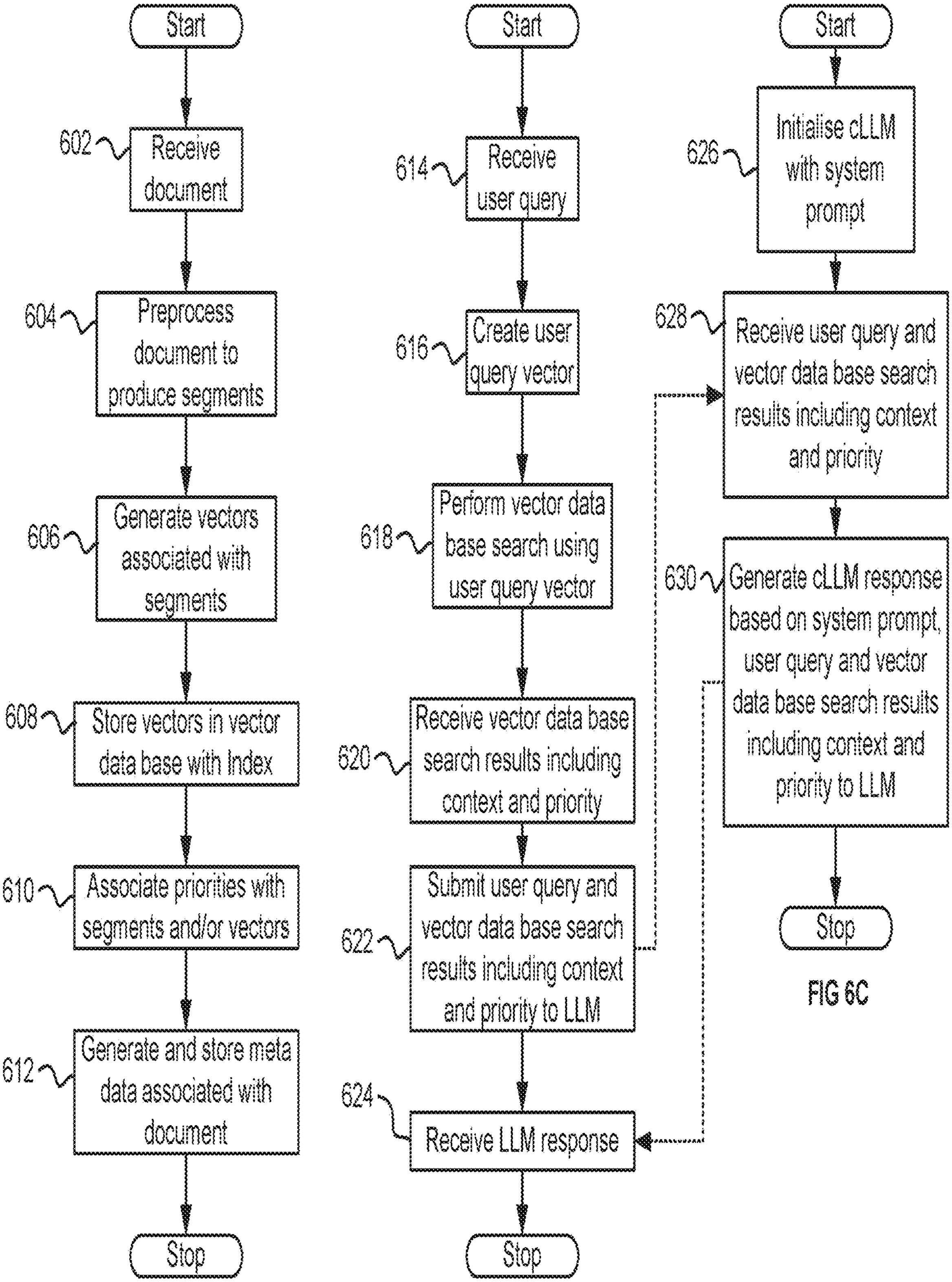
FIGS. 6A-C shows a flow chart for determining a credibility score associated with documents in a knowledge base.

Referring to FIG. 6, there is shown a view 600 of three flowcharts depicted in FIGS. 6A, 6B and 6C showing processing associated with the examples described herein.

FIG. 6A is a flowchart of the processing associated with populating the vector database 116. At 602, a document 124, such as, for example, document 302, is selected from the knowledge base 122. The selected document 124, 302 is segmented into segments, which are also known as chunks, at 604. The segment or segments are examples of the above described chunk or chunks. The segments are vectorised at 606, that is, vectors, or embeddings corresponding to each segment are generated and stored in the vector database 116 together with a respective index at 608. At 610, a set of priorities is associated with at least one, or both, of the following: the vectors corresponding to the segments or the segments per se. Meta data can also be generated and associated with at least one, or both, of: the vectors or the segments at 612.

FIG. 6B is a flowchart of the processing associated with obtaining the cLLM response 110 to the user query 106 from the cLLM 108. The user query 106 is received at 614. The user query vector 113 corresponding to the user query 106 is created at 616. The user query vector 113 is used to search the vector database 116 at 618. The vector database search results 138 are received at 620. The user query 106 is submitted to the cLLM 108 at 622 together with the vector database search results 138. The cLLM response 110 is received and output via the user interface 104 at 624.

FIG. 6C is a flowchart of the processing associated with the cLLM 108 providing the response 110 to the user query 106. At 626, the cLLM 108 can be, or is, initialised or conditioned with the system prompt 142. As indicated above, the system prompt influences the operation of the cLLM 108 to at least take into account the search results 138 when formulating the cLLM response 110. The search results 138 comprise both of: at least one context and at least a respective priority associated with that context. For instance, examples can be realised in which the cLLM 108 is instructed to give precedence or weight to any priority or priorities associated with the search results. The search results 138, including the at least one context and the at least one respective priority, are received by the cLLM 108 at 628. The cLLM 108 generates, at 630, the cLLM response 110 taking into account the search results 138, in particular, taking into account both of: the at least one context and the at least one priority.

Figure 7A:
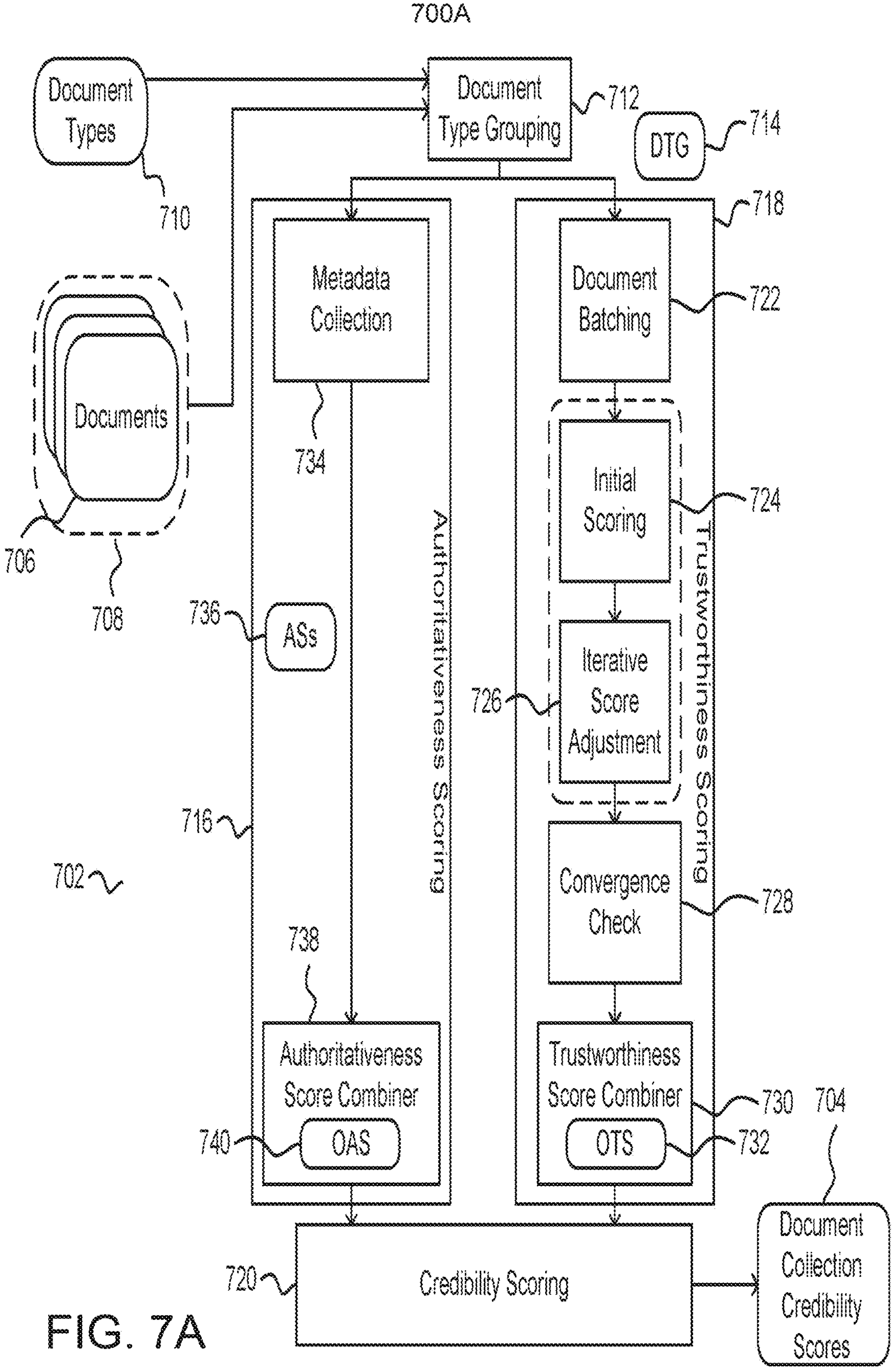
FIGS. 7A-F depict a document classification system according to examples.

Referring to FIG. 7A, there is depicted a view 700A of a document processing system 702 for determining a set of scores 704 associated with documents 706 in a knowledge base 708. The documents 706 and the knowledge base 708 are examples of, or can be realised as, the above described documents 124 and knowledge base 122.

The set of scores 704 comprises one or more than one credibility score. Each credibility score is associated with a respective document of the documents 706. A credibility score is a measure of a respective document's credibility. The credibility can be given relative to the other documents in the knowledge base 708 or relative to an external credibility index or ranking.

The documents 706 are grouped according to a document type selected from a set of prescribed document types 710 by document type grouping circuitry 712 to form a group of documents 714 of the same type. Each document type has a respective set of attributes associated with, or indicative of, documents of a respective document type. The document types 710 are described in further detail with respect to FIG. 7B. The group of documents 714 is processed by authoritativeness scoring circuitry (ASC) 716 and trustworthiness scoring circuitry (TSC) 718.

The ASC 716 processes a set of metadata associated with each document to attribute an overall authoritativeness score to each document.

The TSC 718 processes each document to arrive at respective overall trustworthiness scores based on the content of a respective.

Credibility scoring circuitry 720 is arranged to determine an overall credibility score from the overall authoritativeness score and the overall trustworthiness score of each document.

The TSC 718 comprises document batching circuitry 722. The document batching circuitry 722 divides the group of documents 714 into sets or batches of documents selected from the group of documents 714. The selection of documents from the group of documents 714 can be random or systematic. A set or batch of documents comprises a plurality of documents selected from the group of documents 714. Examples can be realised in which a batch of documents comprises N≥2 documents.

Scoring circuitry 724 is arranged to determine for each batch of documents:

- a cumulative score for each attribute specified in the document type of each document, and
- a cumulative rank for each document within a batch relative to any other documents within the same batch.

Iteration circuitry 726 is arranged to iteratively adjust at least one, or both, of: the cumulative score for each attribute specified in the document type of a document and the cumulative rank for each document within a batch relative to any other documents within the same batch.

After each iteration, convergence circuitry 728 determines whether or not the scores for each attribute of the current or given document type for each document have converged, that is, become sufficiently stable. A score can be deemed to be sufficiently stable if it meets at least a respective criterion. The respective criterion could comprise the difference between a preceding aggregate score and a currently calculated aggregate score having a predetermined relationship relative to a respective convergence threshold. For instance, examples can be realised in which the predetermined relationship is that there is less than a prescribed difference between a preceding aggregate score and a current aggregate score. Additionally, or alternatively, convergence may be deemed to have occurred if the scores do not change by more than a predetermined threshold over a plurality of iterations.

A determination is made regarding whether or not scores corresponding to all attributes of the given or current document type have been calculated. If all attributes of a set of attributes of a given document type have not been processed, the next attribute of the set of attributes of the given document type is selected and processing resumes with the batching of the documents, by the document batching circuitry 722, and determining overall aggregate scores for the current attribute for each document until all attributes of the given or current document type have been processed, that is, the documents are processed on a per attribute per document type basis.

Having determined scores for all attributes of a given document type, the above processing is repeated for the next document type in the set of document types 710 until attribute scores have been determined for all attributes associated with each document of that next document type. The foregoing is repeated for each document type within the set of document types 710.

Trustworthiness combiner circuitry 730 is arranged to produce a respective overall trustworthiness score (OTS) 732 that is derived from the attribute scores for each document. Examples can be realised in which the respective overall trustworthiness score 732 is derived from a simple average of the attribute scores for a given document. Examples can be realised in which the respective overall trustworthiness score 732 is derived from a weighted average of the attribute scores for a given document.

Examples can be realised in which trustworthiness attributes associated with documents categorised as being of a "healthcare study" document type can comprise at least one or more than one of the following taken jointly and severally in any and all permutations:

methodology soundness,
conflict of interest,
information accuracy, and
writing quality.

The ASC 716 comprises metadata collection circuitry 734. The metadata collection circuitry 734 collates data for each authoritativeness attribute of a predetermined set of authoritativeness attributes for the document type group 714 and determines an authoritativeness score for each of those authoritativeness attributes. Examples can be realised in which the set of authoritativeness attributes comprises at least one, or both, of: data relating to the author or data relating to the source of a given document. Regarding the data relating to the source of a given document, documents emanating from a reliable source will be attributed a higher source score relative to documents emanating from a less reliable source. For instance, examples can be realised in which academic journals, government websites, and well-known reputable websites receive a higher source score relative to sources having a history of misinformation. In the case of academic journals or scientific journals, a set of metric data can be determined. Examples can be realised in which the set of metric data can be based on, or otherwise associated with: Impact Factor, CiteScore, SCImago, Journal Rank and Source Normalized Impact per Paper. For instance, at the journal article level, the metric data can alternatively, or additionally, be determined from one or more of the following taken jointly and severally in any and all permutations: citation count, peer-review status, h-index and Altimetric score. Still further, additionally or alternatively, metric data relating to an author can comprise one or more than one of the following taken jointly and severally in any and all permutations: the author's background, the author's experience, the author's prior publications, the author's contributions to a field, the author's reputation, and the author's affiliations with academic, professional and commercial institutions.

A set of authoritativeness scores 736 for each document is output by the metadata collection circuitry 734.

Authoritativeness score combiner circuitry 738 produces for each document an overall authoritativeness score (OAS) 740 from the set of authoritativeness scores 736 corresponding to each document. The overall authoritativeness score 740 can be a simple average of each authoritativeness score within a respective set of authoritativeness scores 736 for each document, a weighted sum or average of each authoritativeness score within a respective set of authoritativeness scores 736 for each document, or be determined in some other way that is a function of one or more than one authoritativeness score within a respective set of authoritativeness scores 736 for a given document.

Figure 7B:
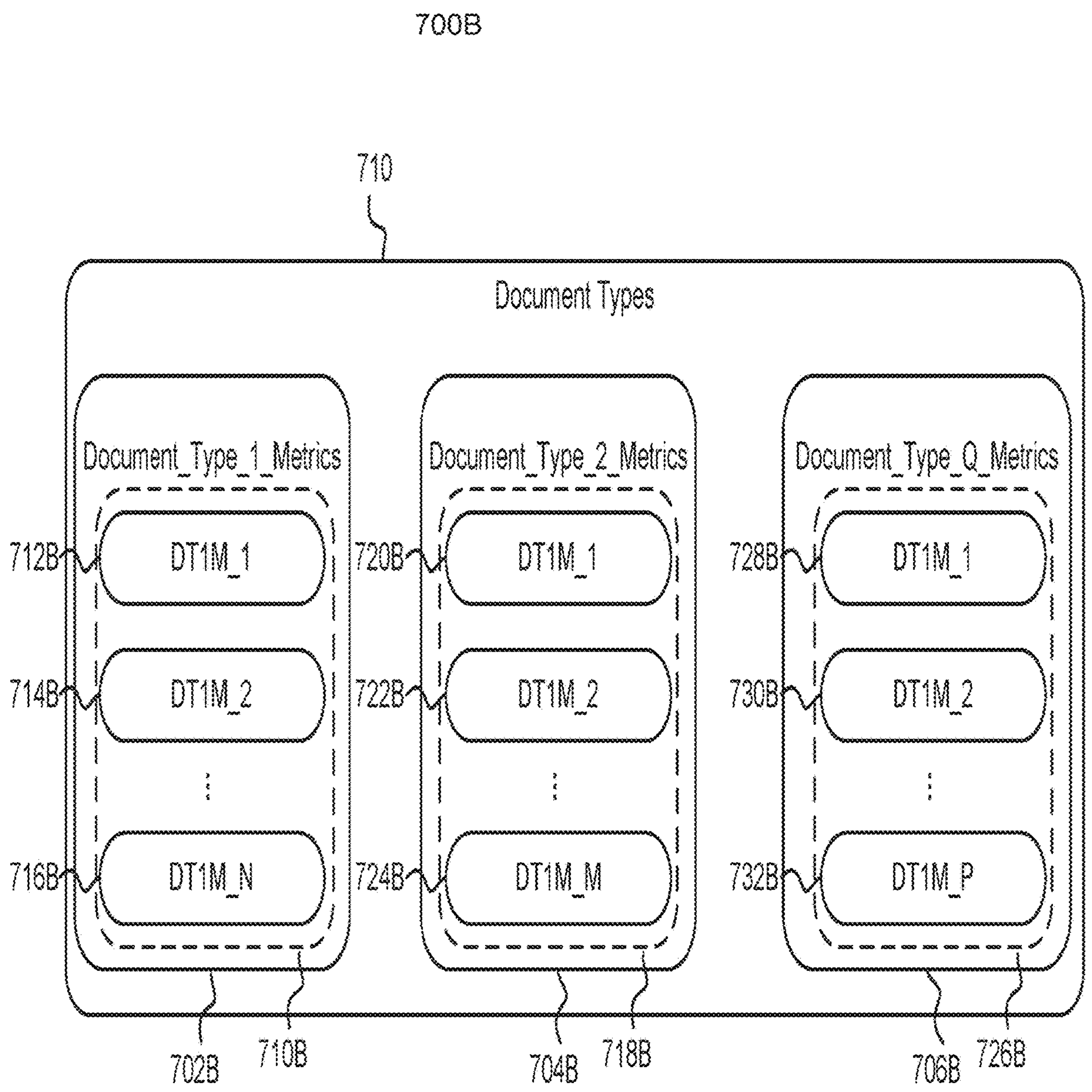

Referring to FIG. 7B, there is shown a view 700B of the set of document types 710 in greater detail. The set of document types 710 comprises at least one or more than one document type. In the example illustrated, the set of document types 710 comprises a number, Q, of document types. In the specific example depicted in FIG. 7B, the set of document types 710 comprises three document types 702B, 704B and 706B. Each document type comprises a set of respective attributes associated with that document type. Each respective set of attributes can comprise one or more than one attribute. A set of respective attributes can comprise a plurality of attributes.

A first document type 702B, DT_1, comprises a set of attributes 710B associated with documents of that type. In the example shown, the set of attributes 710B comprises a plurality of attributes, in particular, N attributes 712B to 716B, where N≥1.

A second document type 704B, DT_2, comprises a set of attributes 718B associated with documents of that type. In the example shown, the set of attributes 718B comprises a plurality of attributes, in particular, M attributes 720B to 724B, where M≥1.

A third, or $Q^{th}$, document type 708B, DT_Q, comprises a set of attributes 726B associated with documents of that type. In the example shown, the set of attributes 726B comprises a plurality of attributes, in particular, P attributes 728B to 732B, where P≥1.

Figure 7C:
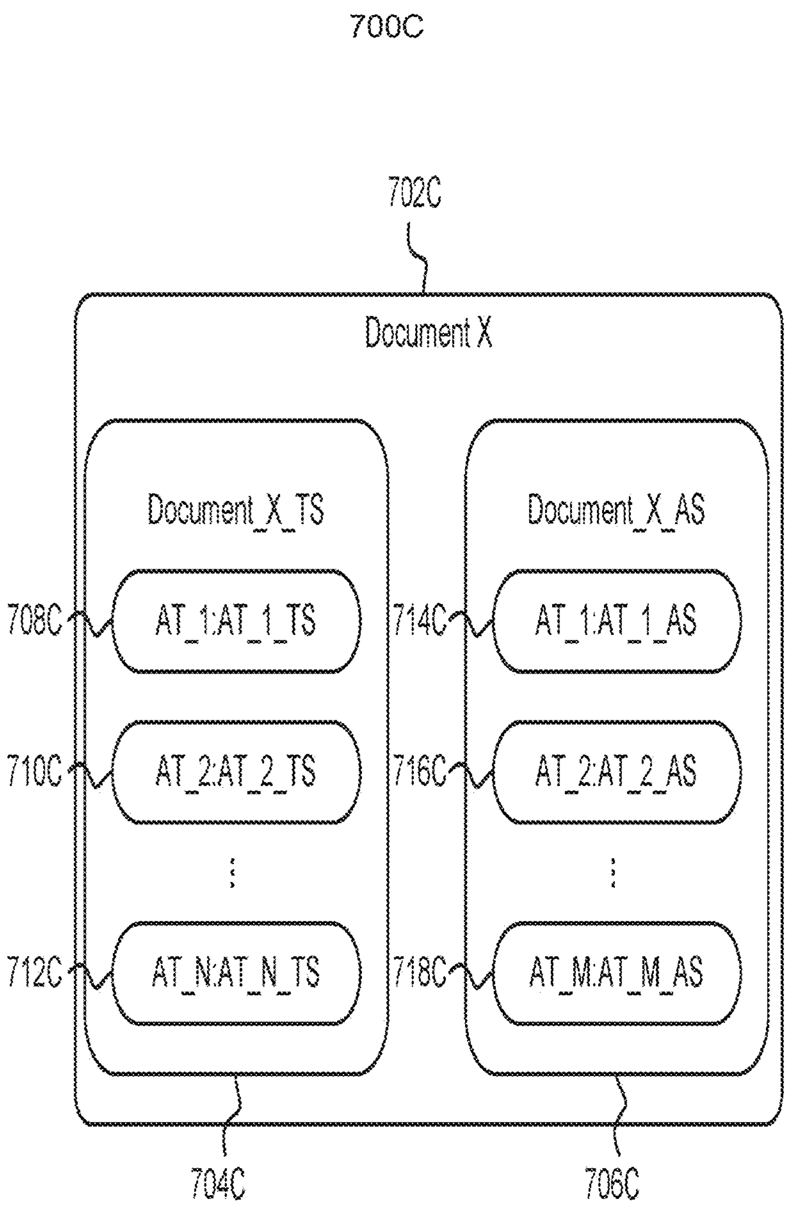

Referring to FIG. 7C, there is shown a view 700C depicting a given document 702C together with a respective set 704C of trustworthiness attribute: trustworthiness score pairs for respective trustworthiness attributes and a respective set 706C of authoritativeness attributes: authoritativeness score pairs for respective authoritativeness attributes. The set 704C can comprise one or more than one trustworthiness attribute: trustworthiness score pair. In the example depicted, the set 704C comprises a plurality of trustworthiness attribute: trustworthiness score pairs 708C to 712C. The set 706C can comprise one or more than one authoritativeness attribute: authoritativeness score pair. In the example depicted, the set 706C comprises a plurality of authoritativeness attribute: authoritativeness score pairs 714C to 718C.

Figure 7D:
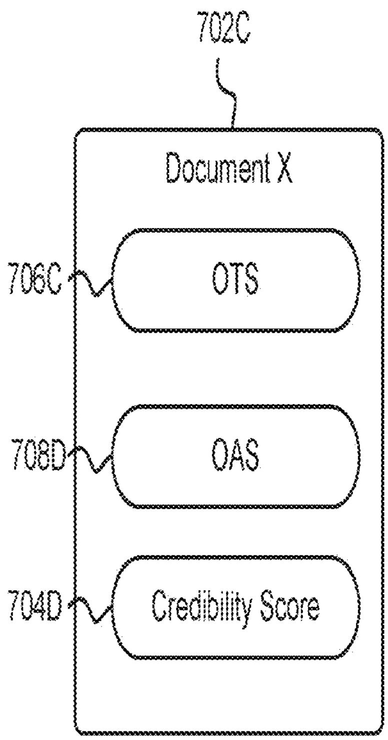

Referring to FIG. 7D, there is shown a view 700D of an alternative example of a given document 702D. The given document 702D comprises a respective credibility score 704D. Alternatively, or additionally, the given document 702D can comprise at least one, or both, of: an overall trustworthiness score 706D and an overall authoritativeness score 708D. In the example depicted, the given document has associated therewith the credibility score 704D, the overall trustworthiness score 706D and the overall authoritativeness score 708D. The document 702D can be an example of the above described document 702C.

Figure 7E:
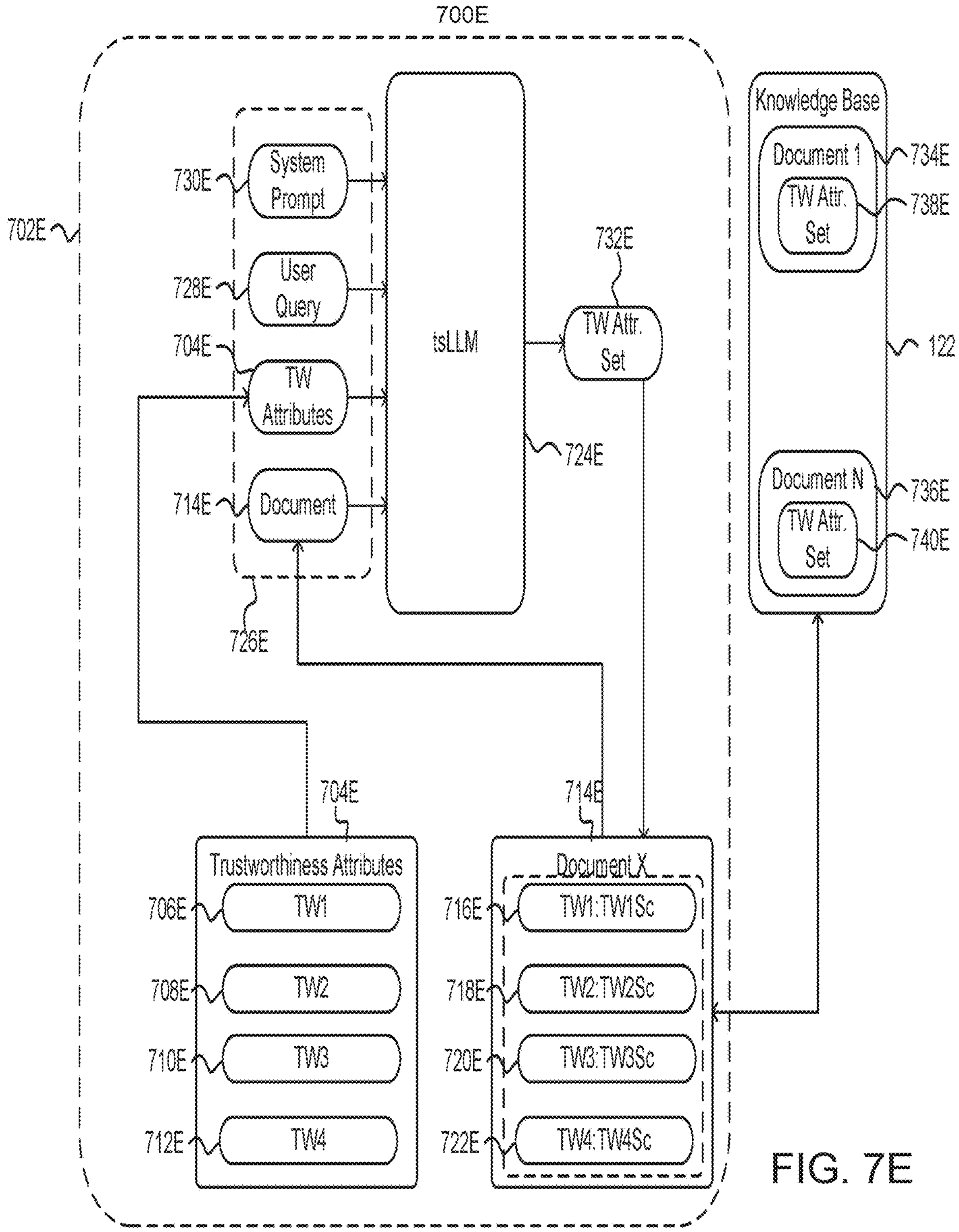

Referring to FIG. 7E, there is shown a view 700E of an example of initial scoring circuitry (ISC) 702E. The ISC 702E is an example of the above described initial scoring circuitry 724. The ISC 702E is arranged to provide a set of documents with a respective set of trustworthiness attribute scores. The set of documents can comprise one document or a plurality of documents. Examples can be realised in which the set of documents comprises all of the documents in the knowledge base 122. The set of trustworthiness attribute scores can comprise a trustworthiness attribute score or a plurality of trustworthiness attribute scores.

The set of trustworthiness attribute scores comprises one or more trustworthiness attribute scores as indicated in a set of prescribed trustworthiness attributes 704E. The set of prescribed trustworthiness attributes 704E comprises a set of attributes 706E to 712E that gives an indication, firstly, of the trustworthiness attributes of a document that are of interest and, secondly, an indication of the relative weightings or importance of those attributes relative to one another. In the example depicted the set of prescribed attributes 704E comprises four trustworthiness attributes 706E to 712E.

A document 714E can be selected from, or provided by, the knowledge base 122 to have relative trustworthiness attribute scores 716E to 722E for each of the trustworthiness attributes 706E to 712E determined using a trustworthiness scoring LLM (tsLLM) 724E. A first trustworthiness attribute, TW1, has a respective trustworthiness attribute score of TW1Sc, a second trustworthiness attribute, TW2, has a respective trustworthiness attribute score of TW2Sc, a third trustworthiness attribute, TW3, has a respective trustworthiness attribute score of TW3Sc and a fourth trustworthiness attribute, TW4, has a respective trustworthiness attribute score of TW4Sc. The tsLLM 724E is responsive to a set of inputs 726E. The set of inputs 726E comprises a user query 728E, the set of trustworthiness attributes 704E and a current document 714E the trustworthiness attribute scores of which are to be determined. The set of inputs 726E can also comprise a system prompt 730E. The user query 728E is arranged to instruct or request the tsLLM 724E to determine relative trustworthiness attribute scores for the prescribed trustworthiness attributes 706E to 712E for the current document 714E. The system prompt 730E is arranged to condition to the tsLLM 724E to respond to the user query 728E to take into account the prescribed trustworthiness attributes 706E to 712E specified in the set of prescribed trustworthiness attributes 704E when determining a set of respective trustworthiness attribute scores 732E.

An example system prompt could be system_template=""""When using the context provided, favour using sources that have a higher trustworthiness score when constructing the answer""""

The foregoing system prompt can be developed to incorporate additional considerations such as, for example, system_template=""""When using the context provided, favour using sources that have a higher trustworthiness score when constructing the answer, and then consider any other attributes (such as recency) as a secondary consideration""""

The tsLLM 724E produces the set of respective trustworthiness attribute scores 732E corresponding to the current document 714E.

Figure 7F:
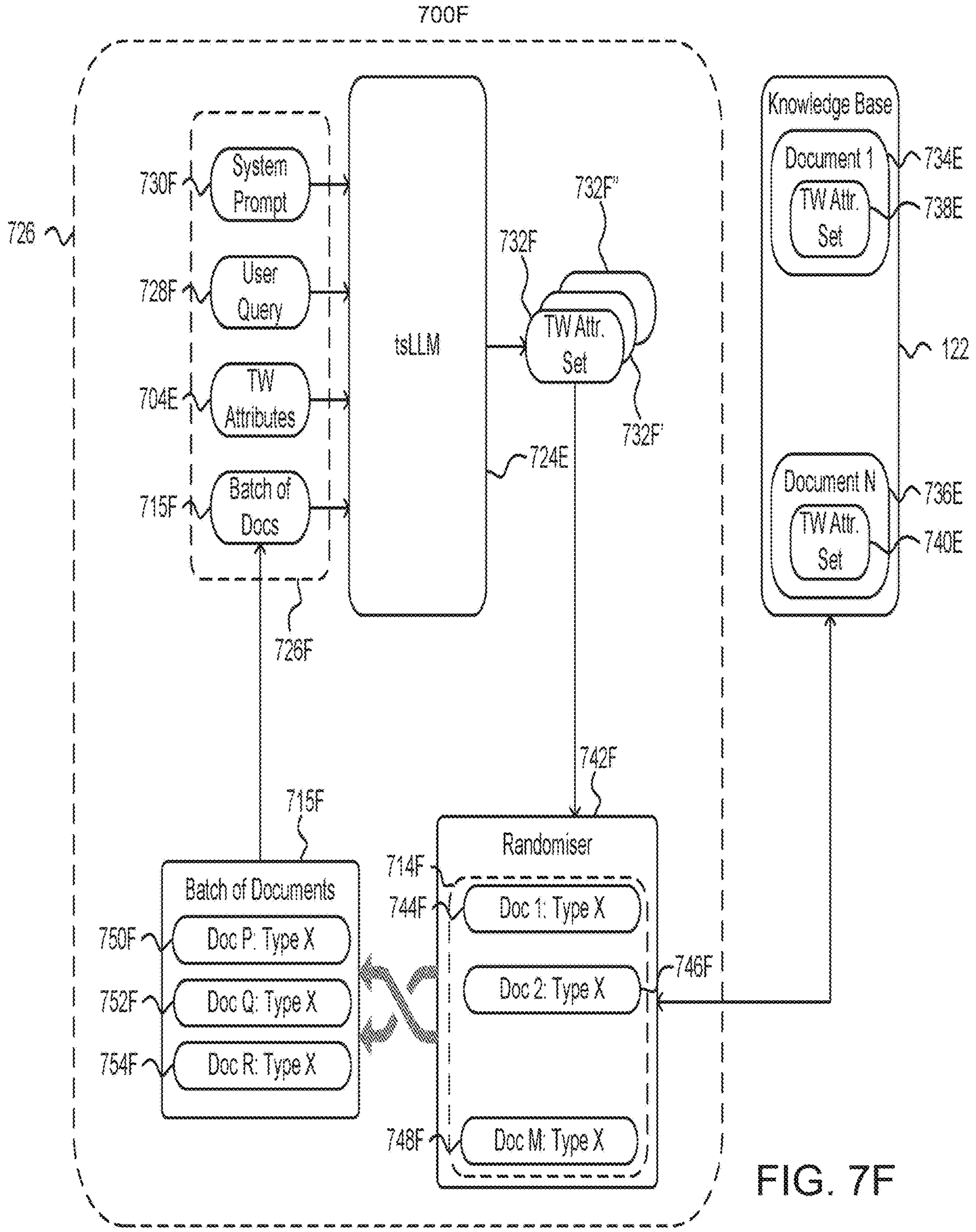

A respective set of trustworthiness attribute scores can be produced for each document in a set of documents contained within the knowledge base 122. The set of documents can comprise a plurality of documents contained within the knowledge base 122. In the example depicted, the knowledge base 122 is indicated as comprising N documents 734E to 736E with respective sets of trustworthiness attribute scores 738E to 740E corresponding to the prescribed trustworthiness attributes 706E to 712E specified in the set of prescribed trustworthiness attributes 704E. The set of current trustworthiness attribute scores will be iteratively refined as described below with reference to FIG. 7F.

The set of prescribed trustworthiness attributes 704E comprises the set of attributes 706E to 712E that gives an indication, firstly, of the trustworthiness attributes of a document that are of interest and, secondly, an indication of relative weightings or importance of those attributes relative to one another. The set of trustworthiness attributes can be user defined. A set of trustworthiness attributes can vary with the type of document. For example, a set of trustworthiness attributes associated with a clinical trial can comprise one or more than one attribute of the following elements or attributes taken jointly and severally in any and all permutations:

{Randomization: Ensuring that participants are assigned to treatment groups randomly to reduce bias and increase the reliability of the results, Blinding (Masking): Blinding participants, healthcare providers, and/or outcome assessors helps to minimise bias by preventing knowledge of the treatment assignment, Placebo Control: Using a placebo control group helps to control for the placebo effect and provides a comparison for the active treatment, Sample Size: Adequate sample size ensures that the study has sufficient enough statistical power to detect meaningful differences or effects, Informed Consent: Ensuring that participants are fully informed about the study procedures, potential risks, and benefits, and that they provide voluntary consent to participate, Ethical Approval: Obtaining approval from an Institutional Review Board (IRB) or Ethics Committee ensures that the study is conducted ethically and in accordance with regulatory standards, Protocol Adherence: Adhering to a predefined study protocol helps to maintain consistency and validity of the study procedures, Data Integrity: Ensuring that data collection, recording, and analysis are conducted accurately and transparently to prevent data manipulation or fabrication, Outcome Measures: Using validated and clinically relevant outcome measures that are sensitive to detect changes or effects of the intervention, Data Monitoring: Implementing independent data monitoring committees or safety monitoring boards to oversee the conduct of the trial and ensure participant safety, Statistical Analysis Plan: Pre-specifying the statistical analysis plan before unblinding the data to prevent post-hoc analysis or data-driven results, Publication Bias: Addressing publication bias by ensuring that all study results, regardless of outcomes, are reported transparently and made publicly available, and Conflict of Interest: Disclosing any conflicts of interest among investigators, sponsors, or institutions that could potentially influence the study outcomes or interpretation of results.}

In the example depicted, the set of prescribed attributes 704E comprises four trustworthiness attributes 706E to 712E.

Having determined an initial set of trustworthiness attribute scores for each document in a set of documents, those trustworthiness attribute scores are refined relative to other documents in the set of documents. Accordingly, referring to FIG. 7F, there is shown a view 700F of an example of iteration circuitry (IC) 702F. The IC 702F is an example of the above described iteration circuitry 726. The IC 702F is arranged to provide a set of documents with a respective set of iteratively refined trustworthiness attribute scores. The set of documents can comprise one document or a plurality of documents. Examples can be realised in which the set of documents comprises the knowledge base 122. The set of iteratively refined trustworthiness attribute scores can comprise an iteratively refined trustworthiness attribute score or a plurality of iteratively refined trustworthiness attribute scores.

The set of iteratively refined trustworthiness attribute scores comprises one or more iteratively refined trustworthiness attribute scores as indicated in the set of prescribed trustworthiness attributes 704E.

A set of documents 714F can be selected from, or provided by, the knowledge base 122 according to a current document type to have relative iteratively refined trustworthiness attribute scores 716E to 722E for each of the trustworthiness attributes 706E to 712E determined using the trustworthiness scoring LLM (tsLLM) 724E. The tsLLM 724E is responsive to a set of inputs 726F. The set of inputs 726F comprises the user query 728E, the set of trustworthiness attributes 704E, a current batch of documents 715F the iteratively refined trustworthiness attribute scores of which are to be determined and respective sets of current trustworthiness attribute scores 704D. The set of inputs 726F can also comprise a system prompt 730F. A user query 728F is arranged to instruct or request the tsLLM 724E to determine relative iteratively refined trustworthiness attribute scores for the prescribed trustworthiness attributes 706E to 712E for the current batch of documents 715F. The system prompt 730F is arranged to condition to the tsLLM 724E to respond to the user query 728F to take into account the prescribed trustworthiness attributes 706E to 712E specified in the set of prescribed trustworthiness attributes 704E when determining a set of respective iteratively refined trustworthiness attribute scores 732F. The tsLLM 724E produces a set of respective trustworthiness attribute scores 732F corresponding to each document in the current batch of documents 715F.

A respective set of iteratively refined trustworthiness attribute scores can be produced for each document in a set of documents contained within the knowledge base 122. The set of documents can comprise a plurality of documents contained within the knowledge base 122. In the example depicted, the knowledge base 122 is indicated as comprising the N documents 734E to 736E with respective sets of iteratively refined trustworthiness attribute scores 738E to 740E corresponding to the prescribed trustworthiness attributes 706E to 712E specified in the set of prescribed trustworthiness attributes 704E. The iteratively refined trustworthiness attribute scores are adjusted on each iteration, having been initialised as the above initial trustworthiness attribute scores.

A randomiser 742F is arranged to construct the current batch of documents 715F. The randomiser 742F can construct the current batch of documents 715F by, for example, randomly selecting a set of documents from a current set of documents 715F having a prescribed type selected from, or provided by, the knowledge base 122. In the example depicted, the current set of documents 714F having the prescribed type comprises a plurality of M documents 744F to 748F, where M≥1.

The current batch of documents 715F comprises a plurality of documents. In the example depicted, the current batch of documents 715F comprises three documents 750F to 754F of a prescribed document type X.

As indicated above, a set of trustworthiness attribute scores 732F, 732F', 732F" is determined for each of the documents 750F to 754F respectively in the batch of documents 715F. The sets of trustworthiness attribute scores are used to update the respective documents' set of current trustworthiness attribute scores 738E to 740E.

Having updated the trustworthiness attribute scores of each of the documents 750F to 754F in the current batch of documents 715F, the randomiser 742F is arranged to generate a new current batch of documents for which respective trustworthiness attribute scores will be determined. The process of iteratively refining the sets of trustworthiness attribute scores for each document of the current type is repeated until there is sufficient convergence of the scores. Examples can be realised in which there is sufficient convergence of the scores if the scores for a given or current set of documents 714F does not change by more than a respective threshold.

Once there is sufficient convergence, processing transfers to the trustworthiness score combiner 730, which operates as described above with reference to FIG. 7A.

Figure 8:
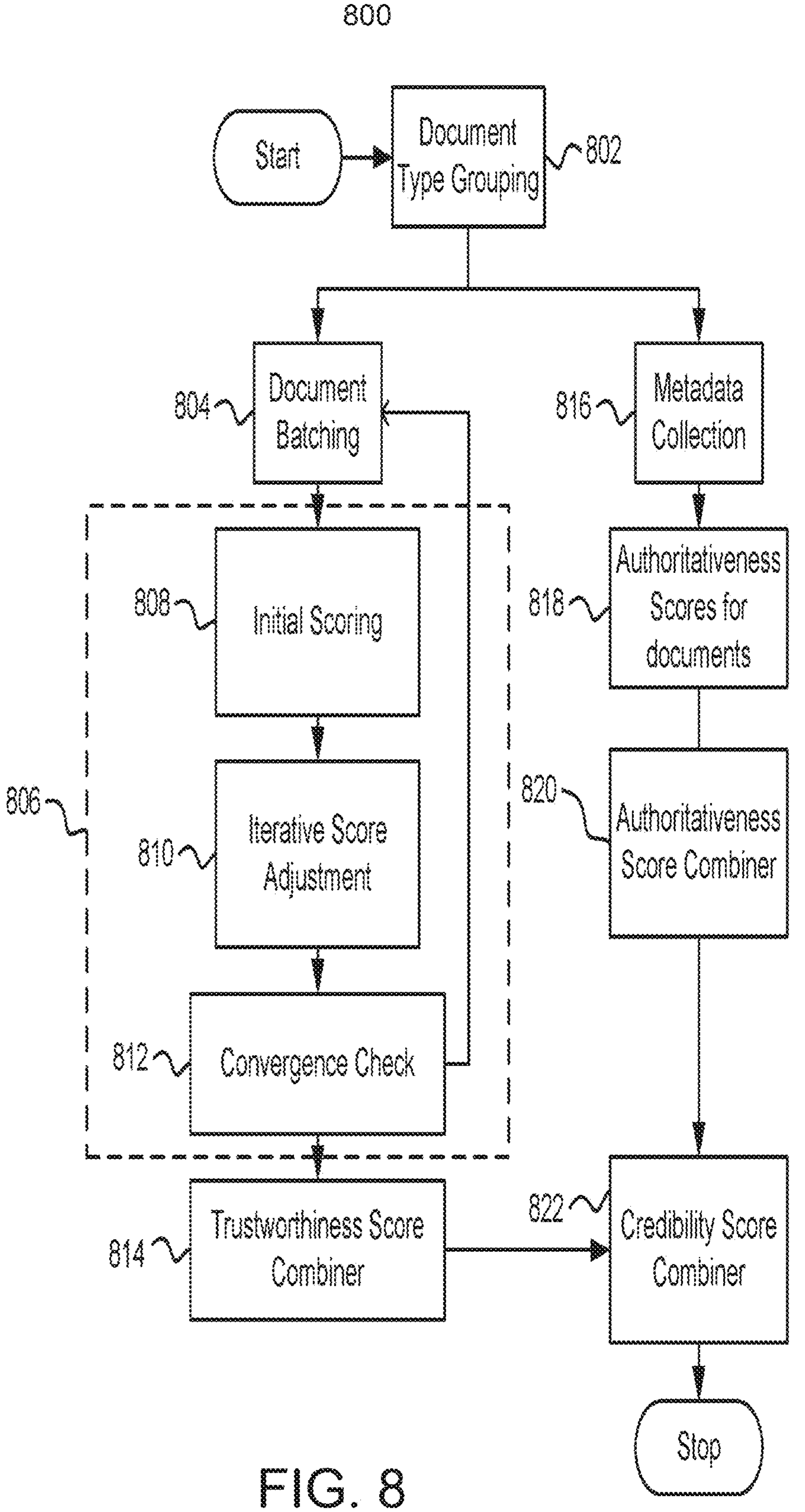
FIG. 8 is a flowchart showing processing of a document classification system according to examples.

Referring to FIG. 8, there is shown a view 800 of a flowchart depicting the processing undertaken by the document processing system 702 in determining at least one or more than one of the following taken jointly and severally in any and all permutations: credibility score, overall trustworthiness score and overall authoritativeness score.

At 802, the group of documents 714 is formed according to a current document type. The group of documents 714 is divided into a number of batches at 804. A trustworthiness score is determined for each attribute of the current document type for each document in each batch at 806. It can be seen that determining the trustworthiness score comprises multiple stages of: determining, at 808, an initial trustworthiness score for each attribute of the current document type for each document in the current document type group 714, iteratively refining, at 810, those trustworthiness scores following selecting different batches of documents, that is, a batch created using a different set of documents, and testing for convergence, at 812, such that calculating those trustworthiness scores is stopped if there is sufficient convergence or further batch determinations and further trustworthiness scores are calculated if there is insufficient convergence.

Processing at 804 to 812 is repeated for each attribute associated with the current document type. Furthermore, processing at 802 to 812 is repeated for each document type.

At 814, an overall trustworthiness score for each document is determined from a respective set of trustworthiness scores of each attribute associated with that document.

At 816, metadata is collected for each document in the document type group 714, and, at 818, a set of authoritativeness attribute scores is determined for each document in the document type group 714 using that meta data.

At 820, an overall authoritativeness score for each document is determined from the set of authoritativeness attribute scores for each document.

At 822, a credibility score is determined for each document from the overall trustworthiness score and the overall authoritativeness score.

Examples can be realised in the form of machine-instructions. The machine-instructions described herein can be stored using respective machine-readable storage. The machine-instructions can be arranged to realise any of the examples described herein. The machine-instructions can be realised as either hardware, software, or a combination of hardware and software. If the machine-instructions are realised as software, the machine-instructions can be processed by an interpreter, processed by a compiler and executed by a processor or given effect in some other way.

Figure 9:
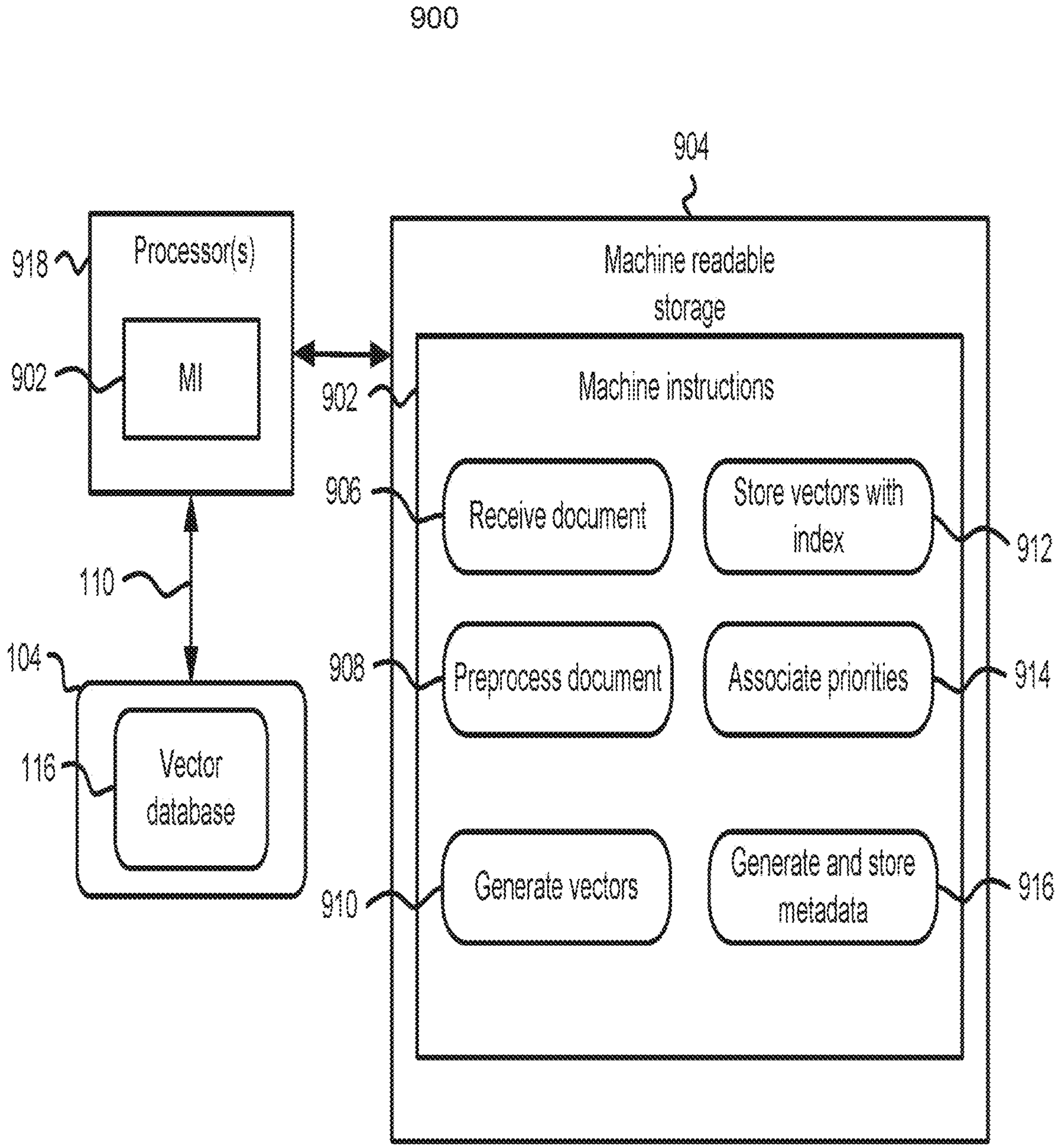
FIG. 9 illustrates machine readable storage according to examples.

Referring to FIG. 9, there is shown a view 900 of machine-instructions 902 for implementing one or more than one of the examples described herein. In particular, the machine-instructions 902 are directed to producing the vector database 116. The machine-instructions 902 can be stored using machine-readable storage 904. The machine-instructions 902 comprise one or more than one of the following taken jointly and severally in any and all permutations:

machine-instructions 906 to receive or otherwise access a document 124 from the knowledge base 122;

machine-instructions 908 to preprocess the document to divide the document into segments;

machine-instructions 910 to generate vectors corresponding to the segments for storage in the vector database 116;

machine-instructions 912 to create and store within the vector database an index associated with the vectors;

machine-instructions 914 to associate respective priorities with the vectors and/or segments stored in the vector database 116; and machine-instructions 916 to generate and store metadata associated with the vectors stored in the vector database 116.

Effect can be given the machine-instructions when processed by a processor or processors 918.

Figure 10:
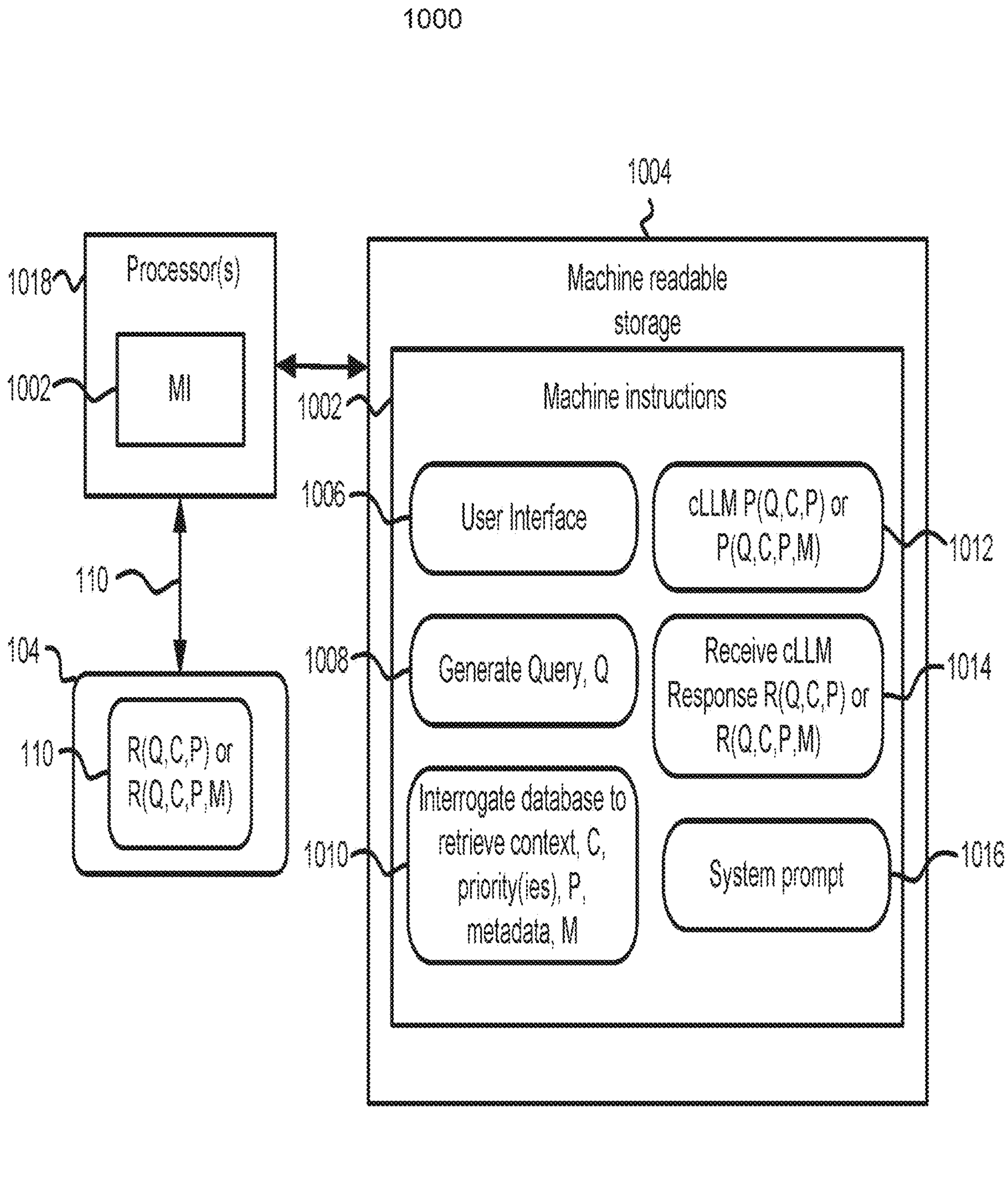
FIG. 10 shows further machine-readable storage according to examples.

Referring to FIG. 10, there is shown a view 1000 of machine-instructions 1002 for implementing one or more than one of the examples described herein. In particular, the machine-instructions 1002 for submitting the user query 106 and receiving the cLLM response 110. The machine-instructions 1002 comprise one or more than one of the following taken jointly and severally in any and all permutations:

machine-instructions 1006 to provide the user interface 104 for receiving the user query 106 and for outputting the cLLM 108 response 110;

machine-instructions 1008 to process the user query 106, that is, to generate the user query vector 113 for searching the vector database 116;

machine-instructions 1010 to interrogate the vector database 116 using the user query vector 113 and to receive the vector database search results 138;

machine-instructions 1012 to submit a prompt to the cLLM 108 based on the user query 106 and the vector database search results 138;

machine-instructions 1014 to receive and output the cLLM response 110; and machine-instructions 1016 to submit the system prompt 142 to the cLLM 108 to influence the operation of the cLLM 108.

Effect can be given to the machine-instructions when processed by a processor or processors 1018.

Figure 11:
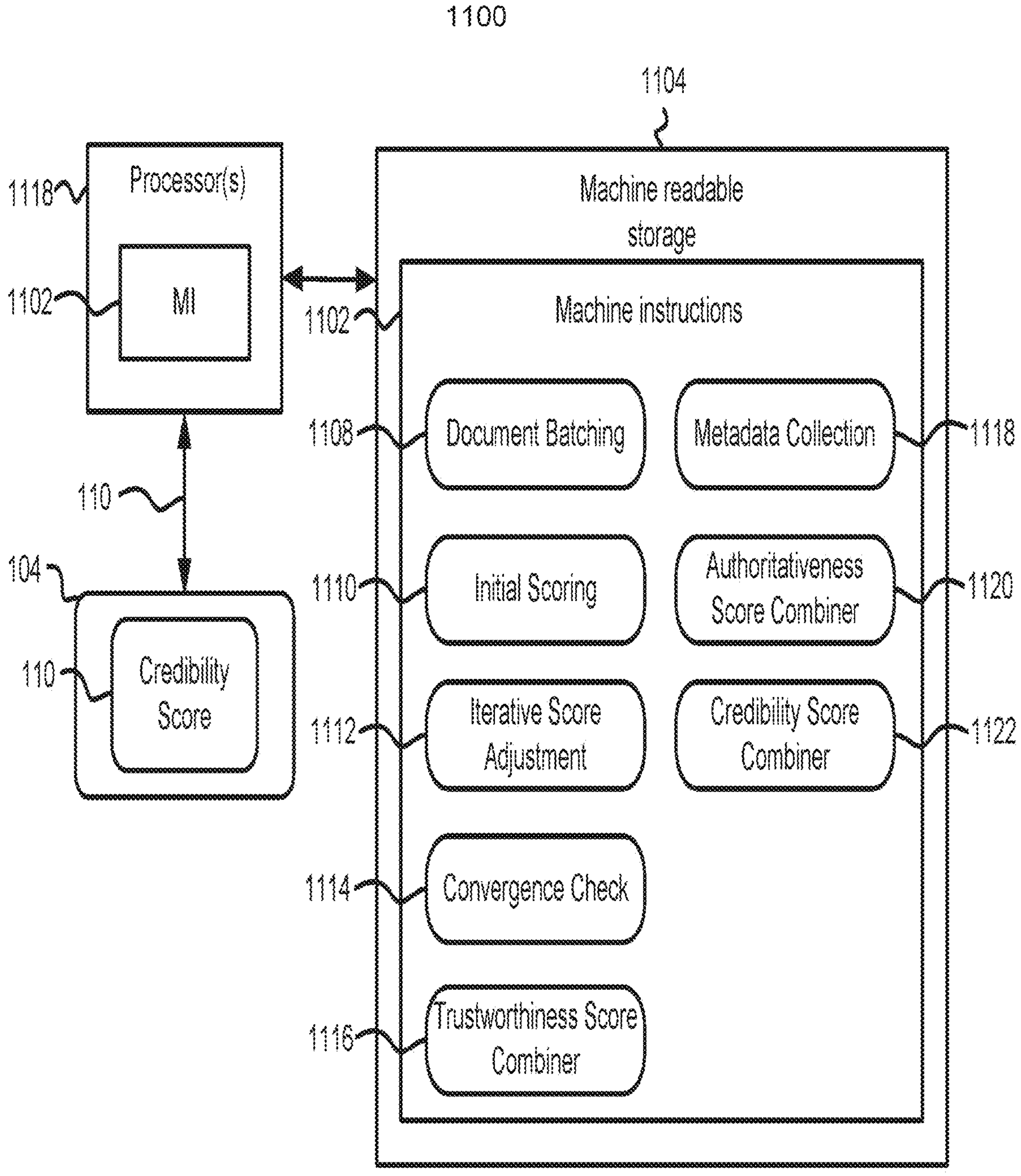
FIG. 11 depicts yet further machine-readable storage according to examples.

Referring to FIG. 11, there is shown a view 1100 of machine-instructions 1102 for implementing one or more than one of the examples described herein when processed by, for example, a processing entity 1106. The processing entity 1106 can comprise, for example, a processor or other implementation entity such as, for example, an interpreter in the case of an interpreted language or a virtual machine. In particular, the machine-instructions 1102 relate to FIGS. 7A to 7G for producing a credibility score for each of the documents in the knowledge base 122. The machine-instructions 1102 comprise one or more than one of the following taken jointly and severally in any and all permutations:

machine-instructions 1108 to create a batch of documents, which can include creating a batch of documents of a specified document type;

machine-instructions 1110 to determine initial trustworthiness scores for a set of trustworthiness attributes for each document, such that a given set of initial trustworthiness attribute scores forms a current set of trustworthiness attribute scores for a respective document;

machine-instructions 1112 to iteratively refine the current sets of trustworthiness attribute scores for each document;

machine-instructions 1114 to test for sufficient convergence of the iteratively refined trustworthiness scores;

machine-instructions 1116 to produce an overall trustworthiness score for each document from respective current sets of iteratively refined trustworthiness scores;

machine-instructions 1118 to determine meta data for each document;

machine-instructions 1120 to determine an overall authoritativeness score from the meta data; and machine-instructions 1122 to produce credibility score from the overall trustworthiness score and the overall authoritativeness score for each document There are various possible implementations of the RAG system 100. Examples can be realised in which a user device can host a client that presents a user interface for receiving queries and outputting responses and that communicates with the query text embedder 112 and/or the completion interface 140 with at least one or both of the query text embedder 112 and the completion interface 140 being hosted by a separate system, or being hosted by respective systems, that are accessible via the client or hosted by the client per se. In such a client implementation, the client would comprise an interface to, or function call for accessing, the query text embedder 112 and/or the completion interface 140. Therefore, examples can be realised in which at least one or more than one of the following taken jointly and severally in any and all permutations is hosted by a device other than a user device: the query text embedder 112, the vector search module 114, the database 116, the uLLM 113', the completion interface 140, the cLLM 108, the knowledge base 122, the document preprocessor 126, the document text embedder 128 and the eLLM 130. Each of the following can be hosted on a respective device: the query text embedder 112, the vector search module 114, the database 116, the uLLM 113', the completion interface 140, the cLLM 108, the knowledge base 122, the document preprocessor 126, the document text embedder 128 and the eLLM 130. Furthermore, each element of the following elements can be hosted on, or at least be accessible from, a respective device together with any one other element or any permutation of any of the other elements selected from: the query text embedder 112, the vector search module 114, the database 116, the uLLM 113', the completion interface 140, the cLLM 108, the knowledge base 122, the document preprocessor 126, the document text embedder 128 and the eLLM 130.

Although the present examples have been described with reference to using a system prompt to condition or influence how an LLM responds to a user query, examples are not limited thereto. Examples can be realised in which a user query contains sufficient information to perform the same function as performed by, or would have been performed by, the system prompt.

The above examples have been described in terms of using respective large language models for various aspects of the above RAG systems. However, examples are not limited thereto. Examples can be realised in which one or more of the above described LLMs are common LLM, in the sense that they are realised using one and the same LLM.

Further examples can be realised according to the following clauses.

Clause 1: An information retrieval system; the system comprising a user interface to generate a user query for input to a large language model;

data retrieval circuitry arranged to access a data base using data associated with the user query, the database comprising data associated with a plurality of documents where each document has a set of priorities associated with respective factors of a set of factors, to retrieve:

a context associated with at least one document of the plurality of documents and a priority of a factor of the set of factors of the at least one document responsive to the query;

a large language model interface to access the large language model (LLM); the large language model interface being arranged to:

submit an LLM query to the large language model; the LLM query comprising data associated with the user query, the retrieved context, and the retrieved priority of the factor of the set of factors, and receive an LLM response from the large language model; the LLM response comprising data, responsive to the LLM query, associated with:

the user query, the retrieved context, and the retrieved priority of the factor of the set of factors; and an output interface to output data associated with the LLM response;

Clause 2: The retrieval augmented generation system of clause 1, in which the set of factors comprises data relating to at least one, or more than one, of the following factors taken jointly and severally in any and all permutations:

Recency,

Authoritativeness,

Popularity,

Geography,

Trustworthiness,

Modality,

Credibility, and

Promotion preference.

Clause 3: The retrieval augmented generation system of clause 2, further comprising weighting factor circuitry; the weighting factor circuitry being arranged to generate weightings associated with a set of factors comprising at least one or more than one factor.

Clause 4: The retrieval augmented generation system of clause 3, in which the weighting factor circuitry is responsive to the user query to receive at least one weighting of a factor of a respective set of factors.

Clause 5: The retrieval augmented generation system of any of clauses 3 to 4, in which the weighting factor circuitry comprises an interface to a weightings factor LLM (wfLLM) to determining the weightings of each factor of the set of factors associated with each document in the batch of documents; the interface being configured to provide information to the wfLLM; the information comprising:

a current document of the batch of documents, the set of factors associated with each document of the batch of documents, and at least an wfLLM user query configured to request the wfLLM to determine relative weightings for the factors in the set of factors for the current document; and, optionally, a system prompt to configure the wfLLM to influence how the wfLLM responds to the wfLLM user query.

Clause 6: The retrieval augmented generation system of any of clauses 2 to 5, comprising determining the credibility from a document classification system as claimed in any of clauses 9 to 21.

Clause 7: The retrieval augmented generation system of any preceding clause, in which the data retrieval circuitry is arranged to generate the LLM query to prioritise contexts within the LLM query according to the priority of the factor of the set of factors.

Clause 8: The retrieval augmented generation system of any preceding clause, in which the large language model is multimodal.

Clause 9: A document classification system for determining a credibility measure for a respective document; the system comprising:

authoritativeness scoring circuitry arranged to determine an authoritativeness score of at least one document of a plurality of documents;

trustworthiness scoring circuitry arranged to determine a trustworthiness score associated with the at least one document of the plurality of documents;

credibility scoring circuitry arranged to determine a credibility score from at least one, or both, of:

the authoritativeness score and the trustworthiness score, and an output interface for outputting data associated with the credibility score.

Clause 10: The document classification system of clause 9, comprising a trustworthiness score combiner arranged to determine overall trustworthiness scores from respective sets of trustworthiness scores for respective documents of the plurality of documents.

Clause 11: The document classification system of clause 10, comprising trustworthiness score convergence circuitry arranged to determine whether or not trustworthiness scores for a document of the plurality of documents are stable.

Clause 12: The document classification system of clause 11, in which each set of trustworthiness scores comprises at least one trustworthiness score based on at least one common trustworthiness attribute.

Clause 13: The document classification system of clause 12, in which the at least one common trustworthiness attribute comprises at least one, or more than one, of the following trustworthiness attributes taken jointly and severally in any and all permutations:

methodology soundness, conflict of interest, information accuracy, and writing quality.

Clause 14: The document classification system of any of clauses 9 to 13, in which the trustworthiness scoring circuitry comprises document batching circuitry arranged to form a batch of documents comprising a number of documents of the plurality of documents grouped according to a respective type.

Clause 15: The document classification system of clause 14, in which the trustworthiness scoring circuitry comprises an initial scoring circuitry arranged to determine a ranking for each document in the batch based on at least one common trustworthiness attribute.

Clause 16: The document classification system of any of clauses 9 to 15, in which the authoritativeness score comprises an overall authoritativeness score derived from a set of metadata associated with a set of documents comprising at least one document.

Clause 17: The document classification system of clause 16, in which the set of metadata comprises at least one, or more than one, of the following taken jointly and severally in any and all permutations:

Impact Factor,
CiteScore,
SCImago Journal Rank,
Source Normalized Impact per Paper,
Citation count,
Peer-review status,
H-index,
Altmetric score, and
An expertise index associated with the author.

Clause 18: The document classification system of any of clauses 9 to 17, in which the trustworthiness scoring circuitry comprises an interface to a trustworthiness scoring LLM (tsLLM) to determining a set of trustworthiness attributes associated with a current document in the batch of documents.

Clause 19: The document classification system of clause 18, in which the trustworthiness scoring circuitry interface is configured to provide information to the tsLLM; the information comprising:

a current document of the batch of documents, the set of factors associated with each document of the batch of documents, and at least an tsLLM user query configured to request the tsLLM to determine relative weightings for the factors in the set of factors for the current document; and, optionally, a system prompt to configure the tsLLM to influence how the tsLLM responds to the tsLLM user query.

Clause 20: The document classification system of any of clauses 18 to 19, in which the trustworthiness scoring circuitry comprises document selection circuitry arranged to form a current batch of documents selected from a set of documents of a common respective type to have respective sets of trustworthiness attributes determined.

Clause 21: The document classification system of clause 20, in which the document selection circuitry is arranged to select documents to form the current batch of documents from the set of documents of the common respective type at least one, or both, of: randomly or according to at least prescribed criterion or rule.

Clause 22: A machine-readable storage storing instructions arranged, when processed, to realise a retrieval augmented generation system; the instructions comprising:

instructions to realise a user interface to generate a user query, comprising input data, for input to a large language model (LLM);

data base searching circuitry to provide at least one context and a respective set of merit measures associated with the at least one context in response to data associated with the user query; the at least one context being derived from a data base comprising a plurality of contexts, each context being associated with respective documents of a plurality of documents where each document has a respective set of merit measures corresponding to a respective set of factors in which each set of merit measures comprises at least one merit measure, the LLM being arranged to receive a context in response to the user query together with a respective merit measure for that context; the respective merit measure associated with that context being derived from the at least one merit measure of a respective document associated with that context, the large language model interface being arranged to:

submit an LLM query to the LLM; the LLM query comprising data associated with the user query, and the at least one context and respective set of merit measures associated with the at least one context; and generate an LLM response to the user query; the LLM response comprising data, responsive to the LLM query, associated the user query, the at least one context and respective set of merit measures associated with the at least one context, an output interface to output data associated with the LLM response.

Clause 23: The machine-readable storage of clause 22, in which the set of factors comprises data relating to at least one, or more than one, of the following factors taken jointly and severally in any and all permutations:

Recency,
Authoritativeness,
Popularity,
Geography,
Trustworthiness,
Modality,
Credibility, and
Promotion preference.

Clause 24: The machine-readable storage of clause 23, comprising determining the Credibility from a document classification system as claimed in any of clauses 30 to 42.

Clause 25: The machine-readable storage of any of clauses 22 to 24, further comprising weighting factor instructions; the weighting factor instructions being arranged to generate weightings associated with a set of factors comprising at least one or more than one factor.

Clause 26: The machine-readable storage of clause 24, in which the weighting factor instructions are responsive to the user query to receive at least one weighting of a factor of a respective set of factors.

Clause 27: The machine-readable storage of any of clauses 22 to 26, in which the weighting factor instructions comprises interface instructions to a weightings factor LLM (wfLLM) to determining the weightings of each factor of the set of factors associated with each document in the batch of documents; the interface being configured to provide information to the wfLLM; the information comprising:

a current document of the batch of documents, the set of factors associated with each document of the batch of documents, and at least an wfLLM user query configured to request the wfLLM to determine relative weightings for the factors in the set of factors for the current document; and, optionally, a system prompt to configure the wfLLM to influence how the wfLLM responds to the wfLLM user query.

Clause 28: The machine-readable storage of any of clauses 22 to 27, comprising instructions arranged to instruct the LLM to prioritise contexts within the LLM response according to the priority of any factor of the set of factors associated with the user query.

Clause 29: The machine-readable storage of any of clauses 22 to 28, in which the large language model is multimodal.

Clause 30: Machine-readable storage storing instructions to realise a document classification system for determining a credibility measure for a respective document; the instructions comprising:

authoritativeness scoring instructions arranged to determine an authoritativeness score of at least one document of a plurality of documents;

trustworthiness scoring instructions arranged to determine a trustworthiness score associated with the at least one document of the plurality of documents;

credibility scoring instructions arranged to determine a credibility score from at least one, or both, of:

the authoritativeness score and the trustworthiness score, and an output interface instructions for outputting data associated with the credibility score.

Clause 31: The machine-readable storage of clause 30, comprising a trustworthiness score combiner instructions arranged to determine overall trustworthiness scores from respective sets of trustworthiness scores for respective documents of the plurality of documents.

Clause 32: The machine-readable storage of clause 31, comprising trustworthiness score convergence instructions arranged to determine whether or not trustworthiness scores for a document of the plurality of documents are stable.

Clause 33: The machine-readable storage of clause 32, in which each set of trustworthiness scores comprises at least one trustworthiness score based on at least one common trustworthiness attribute.

Clause 34: The machine-readable storage of clause 33, in which the at least one common trustworthiness attribute comprises at least one, or more than one, of the following trustworthiness attributes taken jointly and severally in any and all permutations:

methodology soundness, conflict of interest, information accuracy, and writing quality.

Clause 35: The machine-readable storage of any of clauses 30 to 34, in which the trustworthiness scoring instructions comprise document batching instructions arranged to form a batch of documents comprising a number of documents of the plurality of documents grouped according to a respective type.

Clause 36: The machine-readable storage of clause 35, in which the trustworthiness instructions comprise an initial scoring circuitry arranged to determine a ranking for each document in the batch based on at least one common trustworthiness attribute.

Clause 37: The machine-readable storage of any of clauses 30 to 36, in which the authoritativeness score comprises an overall authoritativeness score derived from a set of metadata associated with a set of documents comprising at least one document.

Clause 38: The machine-readable storage of clause 37, in which the set of metadata comprises at least one, or more than one, of the following taken jointly and severally in any and all permutations:

Impact Factor,

CiteScore,

SCImago Journal Rank,

Source Normalized Impact per Paper,

Citation count,

Peer-review status,

H-index,

Altmetric score, and

An expertise index associated with the author.

Clause 39: The machine-readable storage of any of clauses 30 to 38, in which the trustworthiness scoring instructions comprises interface instructions to a trustworthiness scoring LLM (tsLLM) to determining a set of trustworthiness attributes associated with a current document in the batch of documents.

Clause 40: The machine-readable storage of clause 39, in which the trustworthiness scoring interface instructions are configured to provide information to the tsLLM; the information comprising:

a current document of the batch of documents, the set of factors associated with each document of the batch of documents, and at least an tsLLM user query configured to request the tsLLM to determine relative weightings for the factors in the set of factors for the current document; and, optionally, a system prompt to configure the tsLLM to influence how the tsLLM responds to the tsLLM user query.

Clause 41: The machine-readable storage of any of clauses 39 to 40, in which the trustworthiness scoring instructions comprises document selection instructions (a randomizer) arranged to form a current batch of documents selected from a set of documents of a common respective type to have respective sets of trustworthiness attributes determined.

Clause 42: The machine-readable storage of clause 41, in which the document selection instructions is arranged to select documents to form the current batch of documents from the set of documents of the common respective type at least one, or both, of: randomly or according to at least prescribed criterion or rule.

The RAG system of the present disclosure enhances the performance of conventional LLMs by integrating a sophisticated data retrieval and classification mechanism. This system utilizes a user interface to generate queries and employs data retrieval circuitry to access a database of documents, each prioritized by factors such as recency, authoritativeness, and credibility. By retrieving context and factor priorities, the system submits enriched queries to the LLM, which improves the relevance and accuracy of responses. The inclusion of weighting factor circuitry allows for dynamic adjustment of factor importance, further refining the LLM's output. Additionally, a document classification system evaluates documents based on trustworthiness and authoritativeness, using scores derived from metadata like Impact Factor and peer-review status. This classification ensures that the LLM processes high-quality, credible information. The multimodal capability of the LLM and the integration of a trustworthiness scoring LLM (tsLLM) further enhance the system's ability to deliver precise and reliable responses, thereby significantly improving LLM performance.

What is claimed is:

1. A retrieval augmented generation system comprising:

a user interface to generate a user query for input to a large language model;

data retrieval circuitry arranged to access a database using data associated with the user query, the database comprising data associated with a plurality of documents where each document has a set of priorities associated with respective factors of a set of factors, to retrieve:

a context associated with at least one document of the plurality of documents and a priority of a factor of the set of factors of the at least one document responsive to the query;

a large language model interface to access the large language model (LLM); the large language model interface being arranged to:

submit an LLM query to the large language model; the LLM query comprising data associated with the user query, the retrieved context, and the retrieved priority of the factor of the set of factors, and receive an LLM response from the large language model;

the LLM response comprising data, responsive to the LLM query, associated with:

the user query, the retrieved context, and the retrieved priority of the factor of the set of factors; and an output interface to output data associated with the LLM response.

2. The retrieval augmented generation system of claim 1, in which the set of factors comprises data relating to at least one, or more than one, of the following factors taken jointly and severally in any and all permutations:

a. Recency,
b. Authoritativeness,
c. Popularity,
d. Geography,
e. Trustworthiness,
f. Modality,
g. Credibility, and
h. Promotion preference.

3. The retrieval augmented generation system of claim 2, further comprising weighting factor circuitry; the weighting factor circuitry being arranged to generate weightings associated with a set of factors comprising at least one or more than one factor.

4. The retrieval augmented generation system of claim 3, in which the weighting factor circuitry is responsive to the user query to receive at least one weighting of a factor of a respective set of factors.

5. The retrieval augmented generation system of any of claim 3, in which the weighting factor circuitry comprises an interface to a weightings factor LLM (wfLLM) to determining the weightings of each factor of the set of factors associated with each document in a batch of documents; the interface being configured to provide information to the wfLLM; the information comprising:

a. a current document of the batch of documents,
b. the set of factors associated with each document of the batch of documents, and
c. at least an wfLLM user query configured to request the wfLLM to determine relative weightings for the factors in the set of factors for the current document; and, optionally,
d. a system prompt to configure the wfLLM to influence how the wfLLM responds to the wfLLM user query.

6. The retrieval augmented generation system of claim 2, comprising determining the credibility from a document classification system.

7. The retrieval augmented generation system of claim 1, in which the data retrieval circuitry is arranged to generate the LLM query to prioritise contexts within the LLM query according to the priority of the factor of the set of factors.

8. The retrieval augmented generation system of claim 1, in which the large language model is multimodal.

9. A retrieval augmented generation method comprising:

generating, via a user interface, a user query for input to a large language model;

accessing, via data retrieval circuitry, a database using data associated with the user query, the database comprising data associated with a plurality of documents where each document has a set of priorities associated with respective factors of a set of factors, to retrieve:

a context associated with at least one document of the plurality of documents and a priority of a factor of the set of factors of the at least one document responsive to the query;

accessing, via a large language model interface, the large language model (LLM), the accessing comprising:

submitting an LLM query to the large language model;

the LLM query comprising data associated with the user query, the retrieved context, and the retrieved priority of the factor of the set of factors, and receiving an LLM response from the large language model;

the LLM response comprising data, responsive to the LLM query, associated with:

the user query, the retrieved context, and the retrieved priority of the factor of the set of factors; and outputting, via an output interface, data associated with the LLM response.

10. The retrieval augmented generation method of claim 9, in which the set of factors comprises data relating to at least one, or more than one, of the following factors taken jointly and severally in any and all permutations:

a. Recency,
b. Authoritativeness,
c. Popularity,
d. Geography,
e. Trustworthiness,
f. Modality,
g. Credibility, and
h. Promotion preference.

11. The retrieval augmented generation method of claim 10, further comprising generating, via weighting factor circuitry, weightings associated with a set of factors comprising at least one or more than one factor.

12. The retrieval augmented generation method of claim 11, in which the generating weightings comprises the weighting factor circuitry being responsive to the user query to receive at least one weighting of a factor of a respective set of factors.

13. The retrieval augmented generation method of claim 11, in which the generating weightings comprises interfacing with a weightings factor LLM (wfLLM) to determine the weightings of each factor of the set of factors associated with each document in a batch of documents; the interfacing being configured to provide information to the wfLLM; the information comprising:

a. a current document of the batch of documents,
b. the set of factors associated with each document of the batch of documents, and
c. at least a wfLLM user query configured to request the wfLLM to determine relative weightings for the factors in the set of factors for the current document; and, optionally,
d. a system prompt to configure the wfLLM to influence how the wfLLM responds to the wfLLM user query.

14. The retrieval augmented generation method of claim 10, comprising determining the credibility from a document classification system.

15. The retrieval augmented generation method of claim 9, in which the accessing the database comprises generating the LLM query to prioritize contexts within the LLM query according to the priority of the factor of the set of factors.

16. The retrieval augmented generation method of claim 9, in which the large language model is multimodal.

* * * * *